(12) United States Patent
Kirkbride

(10) Patent No.: US 11,851,181 B2
(45) Date of Patent: Dec. 26, 2023

(54) SELF-ALIGNING DOCKING MECHANISM FOR AN UNMANNED AERIAL VEHICLE (UAV)

(71) Applicant: The Boeing Company, Chicago, IL (US)

(72) Inventor: David W. Kirkbride, Allyn, WA (US)

(73) Assignee: THE BOEING COMPANY, Arlington, VA (US)

(*) Notice: Subject to any disclaimer, the term of this patent is extended or adjusted under 35 U.S.C. 154(b) by 26 days.

(21) Appl. No.: 17/585,989

(22) Filed: Jan. 27, 2022

(65) Prior Publication Data

US 2022/0144431 A1 May 12, 2022

Related U.S. Application Data

(62) Division of application No. 16/015,410, filed on Jun. 22, 2018, now abandoned.

(51) Int. Cl.
*B64C 39/02* (2023.01)
*B64C 37/02* (2006.01)
(Continued)

(52) U.S. Cl.
CPC ............ *B64C 39/024* (2013.01); *B64C 37/02* (2013.01); *F16B 1/00* (2013.01); *F16B 2/06* (2013.01); *G05D 1/104* (2013.01); *G05D 3/20* (2013.01); *B64U 10/13* (2023.01); *B64U 50/34* (2023.01); *B64U 2101/60* (2023.01); *B64U 2201/102* (2023.01); *F16B 2200/83* (2023.08); *G06Q 50/28* (2013.01)

(58) Field of Classification Search
CPC ......... B64C 39/024; B64C 37/02; F16B 1/00; F16B 2/06; F16B 2001/0035; G05D 1/104; G05D 3/20; B64U 10/13; B64U 2201/102; B64U 2101/60; B64U 50/34; G06Q 50/28

See application file for complete search history.

(56) References Cited

U.S. PATENT DOCUMENTS

| | | | | |
|---|---|---|---|---|
| 4,743,079 A | * | 5/1988 | Bloch | ...................... H01R 4/01 285/308 |
| 8,186,589 B2 | | 5/2012 | Ben Asher et al. | |

(Continued)

FOREIGN PATENT DOCUMENTS

| | | |
|---|---|---|
| EP | 3318489 B1 | 9/2018 |
| KR | 20160031602 A | 3/2016 |
| WO | 2017068998 A1 | 4/2017 |

OTHER PUBLICATIONS

Weisberger, M., "Amazon's 'Mothership': Retailer Gets Patent for Mega-Drone," LiveScience, Jan. 6, 2017, available at: https://www.livescience.com/57416-amazon-patents-flying-mega-drone.html.

*Primary Examiner* — Dale W Hilgendorf
*Assistant Examiner* — Frank T Glenn, III
(74) *Attorney, Agent, or Firm* — COATS & BENNETT, PLLC

(57) ABSTRACT

An unmanned aerial vehicle (UAV) cluster includes a plurality of mission UAVs and a plurality of core UAVs arranged in a cluster. One or more of the mission UAVs is configured for controlled independent flight. The plurality of core UAVs are distributed throughout the cluster according to a selected distribution pattern that distributes the core UAVs according to a predefined mission characteristic of the UAV cluster.

20 Claims, 19 Drawing Sheets

(51) Int. Cl.
*F16B 1/00* (2006.01)
*F16B 2/06* (2006.01)
*G05D 1/10* (2006.01)
*G05D 3/20* (2006.01)
*B64U 10/13* (2023.01)
*B64U 101/60* (2023.01)
*G06Q 50/28* (2012.01)
*B64U 50/34* (2023.01)

(56) References Cited

U.S. PATENT DOCUMENTS

| | | |
|---|---|---|
| 9,415,869 B1 * | 8/2016 | Chan .................... B64C 39/024 |
| 2012/0158215 A1 | 6/2012 | Sun et al. |
| 2014/0374532 A1 | 12/2014 | Duffy et al. |
| 2016/0304217 A1 | 10/2016 | Fisher et al. |
| 2016/0378108 A1 * | 12/2016 | Paczan .................. G05D 1/104 |
| | | 705/330 |
| 2017/0029104 A1 * | 2/2017 | Kim ........................ B64D 1/22 |
| 2017/0144757 A1 | 5/2017 | Hall et al. |
| 2018/0231971 A1 * | 8/2018 | Greenberger ........ G08G 5/0069 |
| 2018/0244386 A1 | 8/2018 | Phan |
| 2020/0148348 A1 | 5/2020 | Bradley et al. |

* cited by examiner

SELF-ALIGNING DOCKING MECHANISM FOR AN UNMANNED AERIAL VEHICLE (UAV)

RELATED APPLICATIONS

The present application is a divisional of U.S. patent application Ser. No. 16/015,410, which was filed on Jun. 22, 2018, the disclosure of which is incorporated herein by reference in its entirety.

TECHNICAL FIELD

The present disclosure relates generally to Unmanned Aerial Vehicles (UAVs), and more particularly to systems for creating and operating a cluster of individual UAVs to deliver a payload to a predefined destination.

BACKGROUND

Companies are beginning to deliver products to their customers using Unmanned Aerial Vehicles (UAVs). In some cases, companies utilize a plurality of UAVs arranged in a cluster to deliver their products. These "clustered UAVs" are especially beneficial as they allow a company to distribute the products as "payloads" to various destination locations in an efficient and cost-effective manner. Examples of such payloads include, but are not limited to, packages, boxes, and bags, and may be of any shape, size, and weight, so long as the UAV cluster is able to carry them.

Typically, consumers interact with a centralized market place to order and purchase the products that are eventually delivered as the payload to the desired destination locations. A UAV cluster is loaded with a payload at a warehouse and flown to the desired delivery location such as the customer's home or business. In some cases, individual UAVs can temporarily separate from the UAV cluster in-flight and deliver the payload before re-docking with the UAV cluster for a return flight.

Current market trends are beginning to replace the centralized market place with a plurality of virtual online market places, each of which may or may not be associated with a corresponding warehouse. Therefore, customer orders can be filled at any given warehouse and flown to respective destination locations. While de-centralization is beneficial, these practices also increase the emphasis on delivering the payloads in a cost-effective manner.

BRIEF SUMMARY

Aspects of the present disclosure relate to creating and operating an Unmanned Aerial Vehicle (UAV) cluster to carry and autonomously deliver one or more payloads to one or more predetermined destination locations.

In one aspect, the present disclosure provides an unmanned aerial vehicle (UAV) cluster comprises a plurality of mission UAVs arranged in a cluster, with a set of one or more of the mission UAVs being configured for controlled independent flight. A plurality of core UAVs are distributed throughout the cluster according to a selected distribution pattern that distributes the core UAVs according to a predefined mission characteristic of the UAV cluster.

In one aspect, each core UAV and each mission UAV in the UAV cluster is a same size and is congruent.

In one aspect, one or both of a number and type of core UAVs to be distributed throughout the UAV cluster is selected based on the predefined mission characteristic.

In one aspect, the predefined mission characteristic comprises one or more of a distance of a destination location from a launch location of the UAV cluster, a type of mission the set of one or more mission UAVs are configured to perform, a number of predetermined intermediate waypoints for the UAV cluster between the launch location of the UAV cluster and the destination location, and a load characteristic of a load carried by the UAV cluster and delivered by the set of one or more mission UAVs.

In one aspect, one of the plurality of core UAVs to be distributed throughout the cluster comprises one of a propulsion UAV configured to augment a propulsion provided by each individual mission UAV in the cluster, a fuel storage UAV comprising a fuel reservoir storing a fuel, and configured to augment the fuel consumed by each individual mission UAV in the cluster, a power UAV configured to augment electrical power consumed by each individual mission UAV in the cluster, and a sensor UAV comprising a sensor.

In one aspect, the sensor comprises a camera configured to capture an image of a destination location.

In one aspect, the sensor comprises a radar.

In one aspect, a first core UAV is configured to control an operation of each of the other core UAVs.

In one aspect, a second core UAV is configured to control an operation of one or more of the plurality of mission UAVs. In such aspect, the second core UAV is different from, and controlled by, the first core UAV.

In one aspect, the present disclosure provides an unmanned aerial vehicle (UAV) system comprising a plurality of individual UAVs arranged in a cluster. In such aspects, the plurality of individual UAVs comprises a plurality of mission UAVs, with a set of one or more mission UAVs being configured for controlled independent flight, and a plurality of core UAVs distributed throughout the cluster according to a selected distribution pattern that distributes the core UAVs within the cluster according to a predefined mission characteristic of the UAV cluster.

In one aspect, the selected distribution pattern defines a corresponding position for each core UAV within the UAV cluster.

In one aspect, individual UAVs in the UAV cluster comprise a same size and are congruent.

In one aspect, one or both of a number and type of core UAVs to be distributed throughout the UAV cluster is selected based on the predefined mission characteristic.

In one aspect, the predefined mission characteristic comprises one or more of a distance of a destination location from a launch location of the UAV cluster, a type of mission the set of one or more mission UAVs are configured to perform, a number of predetermined intermediate waypoints for the UAV cluster between the launch location of the UAV cluster and the destination location, and a load characteristic of a load carried by the UAV cluster, and delivered by the set of one or more mission UAVs.

In one aspect, the plurality of core UAVs comprises a first core UAV configured to control an operation of each of the other core UAVs in the cluster, and a second core UAV, different from the first core UAV, and configured to control operations of the plurality of mission UAVs.

In one aspect, the present disclosure provides a method of operating an unmanned aerial vehicle (UAV) cluster. In such aspects, the method comprises determining a mission characteristic of a mission assigned to a UAV cluster, and based on the mission characteristic, arranging a plurality of mission UAVs to form the UAV cluster, wherein one or more of the mission UAVs is configured for controlled independent flight, selecting a distribution pattern for a plurality of core UAVs, wherein the distribution pattern identifies corresponding positions in the UAV cluster for each of the plurality of core UAVs, and distributing the plurality of core UAVs throughout the UAV cluster according to the distribution pattern.

In one aspect, the method further comprises selecting one or both of a number and type of core UAVs to be distributed throughout the UAV cluster based on the mission characteristic.

In one aspect, each of the mission UAVs and the core UAVs that form the UAV cluster comprises a same size and is congruent. In these aspects, selecting the distribution pattern for the plurality of core UAVs based on the mission characteristic comprises selecting the distribution pattern based on one or more of a distance of a destination location from a launch location of the UAV cluster, a type of mission the set of one or more mission UAVs are configured to perform, a number of intermediate waypoints between the launch location of the UAV cluster and the destination location for the UAV cluster, and a characteristic of a load carried by the UAV cluster and delivered by the one or more mission UAVs.

In one aspect, the plurality of mission UAVs and the plurality of core UAVs are releasably coupled to each other in the UAV cluster. In these aspects, the method further comprises communicatively connecting each of the core UAVs to one or more of the plurality of mission UAVs.

In one aspect, the method further comprises designating a first core UAV as a master core UAV, controlling one or more second core UAVs using the master core UAV, and controlling one or more of the mission UAVs using at least one of the second core UAVs.

In one aspect, the present disclosure provides a self-aligning docking mechanism for an unmanned aerial vehicle (UAV). In these aspects, the self-aligning docking mechanism comprises an alignment circuit configured to generate an alignment signal representing a current alignment of the UAV with a proximate UAV responsive to detecting an indicator signal emitted by the proximate UAV, a docking jaw configured to grip a corresponding docking jaw disposed on the proximate UAV, and a docking control circuit configured to align the docking jaw with the corresponding docking jaw on the proximate UAV based on the alignment signal, and control the docking jaw to grip the corresponding docking jaw to dock the UAV to the proximate UAV.

In one aspect, the self-aligning docking mechanism further comprises an extendable arm configured to releasably attach to a corresponding extendable arm on the proximate UAV.

In one aspect, the extendable arm comprises a magnetic component configured to releasably connect to a corresponding magnetic component disposed on the corresponding extendable arm of the proximate UAV.

In one aspect, the self-aligning docking mechanism further comprises a servo drive operatively connected to both the docking jaw and the docking control circuit. To align the docking jaw with the corresponding docking jaw, the docking control circuit is configured to determine whether the docking jaw is aligned with the corresponding docking jaw responsive to an analysis of the alignment signal, and send an alignment message to the servo drive responsive to determining that the docking jaw and the corresponding docking jaw are not aligned.

In one aspect, to align the docking jaw with the corresponding docking jaw, the servo drive is configured to generate one or more alignment commands responsive to receiving the alignment message from the docking control circuit, and rotate the docking jaw about a longitudinal axis using the one or more alignment commands.

In one aspect, the docking jaw is configured to move between an open state to undock from the corresponding docking jaw, and a closed state to dock with the corresponding docking jaw.

In one aspect, the docking jaw comprises opposing first and second grippers constructed from a shape memory alloy. In such aspects, the docking control circuit is further configured to apply a first voltage to each of the first and second grippers to move the docking jaw to the open state, wherein the first voltage meets or exceeds a threshold value, and reduce the first voltage being applied to the first and second grippers to a second voltage to move the docking jaw to the closed state, wherein the second voltage is less than the threshold value.

In one aspect, to reduce the first voltage to the second voltage, the docking control circuit is configured to cease applying the first voltage to the first and second grippers.

In one aspect, the present disclosure provides a method of docking a first unmanned aerial vehicle (UAV) and a second UAV. The method implemented by the first UAV comprises, during a first docking stage, generating an alignment signal indicating a current state of alignment between the first and second UAVs responsive to detecting an indicator signal emitted by the second UAV. During a second docking stage the method comprises aligning a docking jaw of the first UAV to a corresponding docking jaw of the second UAV based on the alignment signal, and docking the first and second UAVs, wherein the docking comprises controlling the docking jaw of the first UAV to grip the corresponding docking jaw of the second UAV.

In one aspect, during the first docking stage, the method further comprises releasably coupling an arm extending from the first UAV to a corresponding arm extending from the second UAV.

In such aspects, releasably coupling an arm extending from the first UAV to a corresponding arm extending from the second UAV comprises magnetically coupling the arm extending from the first UAV to the corresponding arm extending from the second UAV.

In one aspect, aligning a docking jaw of the first UAV to a corresponding docking jaw of the second UAV based on the alignment signal comprises rotating the docking jaw of the first UAV about a longitudinal axis responsive to determining that the first and second UAVs are misaligned.

In one aspect, the docking jaw of the first UAV comprises opposing first and second grippers constructed from a shape memory alloy. In such aspects, the method further comprises applying a first voltage to each of the first and second grippers to open the docking jaw, wherein the first voltage meets or exceeds a threshold value, and reducing the first voltage being applied to the first and second grippers to a second voltage to close the docking jaw, wherein the second voltage is less than the threshold value.

In one aspect, reducing the first voltage to the second voltage comprises ceasing to apply the first voltage to the first and second grippers.

In one aspect, the present disclosure provides a non-transitory computer-readable medium storing software instructions that, when executed by processing circuitry on a first unmanned aerial vehicle (UAV), causes the processing circuitry to, during a first docking stage, generate an alignment signal indicating a current state of alignment between a docking jaw of the first UAV and a corresponding docking jaw of a second UAV responsive to detecting an indicator signal emitted by the second UAV. During a second docking stage, the software instructions executed by the processing circuitry cause the processing circuitry to align the docking jaw of the first UAV with the corresponding docking jaw of the second UAV based on the alignment signal, and dock the first and second UAVs by controlling the docking jaw of the first UAV to grip the corresponding docking jaw of the second UAV.

BRIEF DESCRIPTION OF THE DRAWINGS

Aspects of the present disclosure are illustrated by way of example and are not limited by the accompanying figures with like references indicating like elements.

DETAILED DESCRIPTION

Aspects of the present disclosure provide an adaptive, mission-configurable and scalable platform architecture for dynamically creating and operating a cluster of individual Unmanned Aerial Vehicles (UAVs) or "drones." These "UAV clusters" are utilized, for example, to carry and deliver a payload or payloads to one or more different destination locations. When compared to using individual UAVs to deliver a payload, the platform of the present disclosure beneficially allows users to create and operate UAV clusters in a much more cost-effective manner. As such, the UAV clusters of the present disclosure are able to achieve a highly efficient flight performance with a substantial increase in both payload capability and range.

In one aspect of the present disclosure, each of the individual UAVs are physically and communicatively interconnected to form a unitary "UAV cluster." There are a variety of functions that a given UAV in the UAV cluster can perform, but the inclusion of any particular UAV(s) in the UAV cluster, their corresponding position(s) within the UAV cluster, and the overall configuration of the UAV cluster is based on the particular mission the UAV is to perform. Such missions include, for example, the delivery of one or more payloads (e.g., customer ordered products) from one or more distribution points (e.g., warehouses) to one or more destination locations associated with corresponding customers.

Each individual UAV in the cluster is capable of autonomous independent flight, but is also capable of such flight as part of the UAV cluster (or as seen later in more detail, a UAV "sub-cluster"). Further, each individual UAV in the UAV cluster is configurable to perform a corresponding mission either alone and/or as part of the larger UAV cluster. Thus, according to the present disclosure, the UAV cluster can be assigned to fly a mission, which each of the individual UAVs in the cluster are configured to support. During that mission, however, individual UAVs in the UAV cluster can temporarily detach from the UAV cluster, perform its own mission for which it was independently configured, and then return to the UAV cluster to once again function as part of that cluster.

Figure 1:
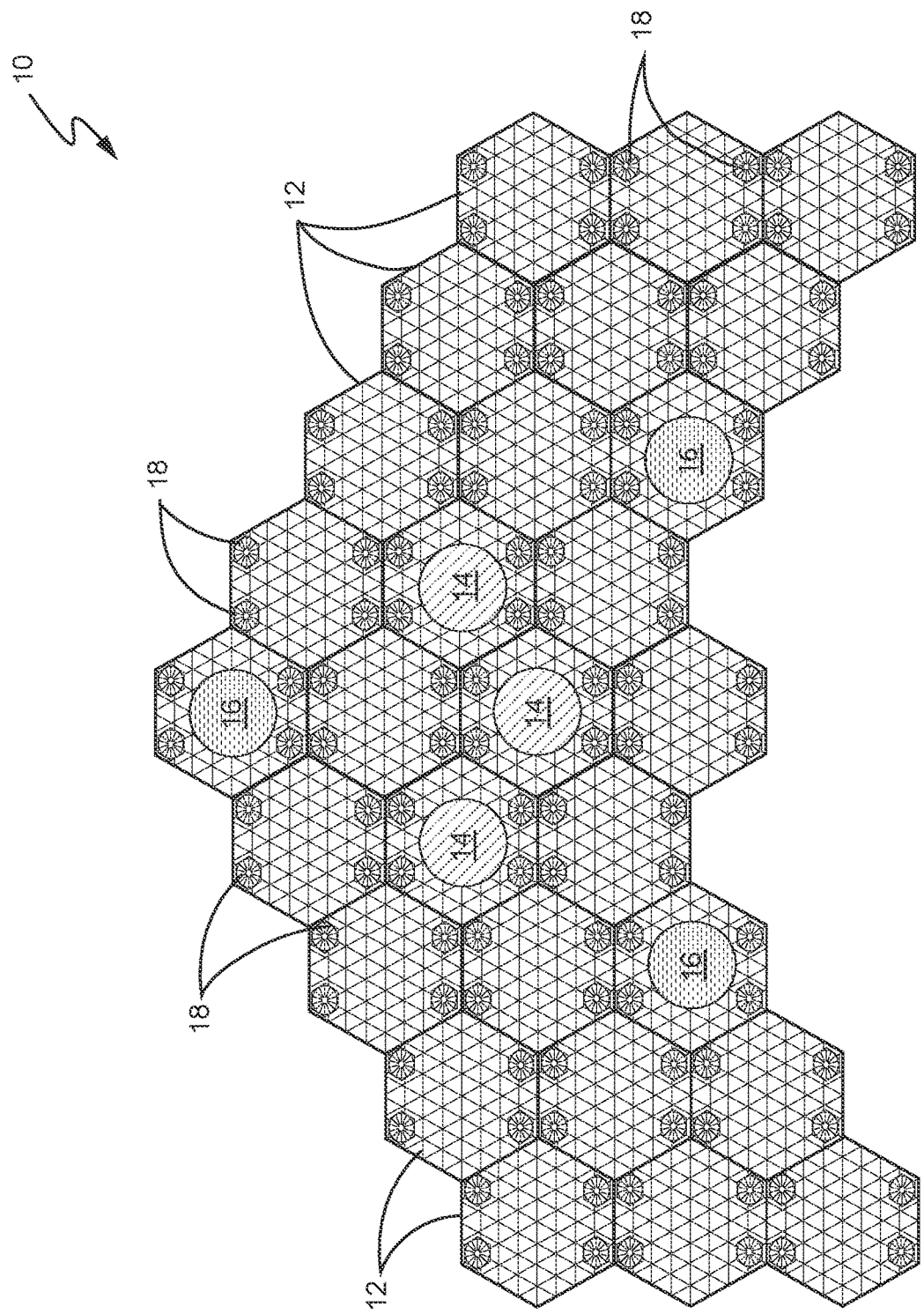
FIG. 1 is a perspective view illustrating an Unmanned Aerial Vehicle (UAV) cluster comprising a plurality of interconnected UAVs according to one aspect of the disclosure.

Turning now to the drawings, FIG. 1 illustrates a UAV system arranged as a UAV cluster 10 configured according to one aspect of the present disclosure. As seen in FIG. 1, UAV cluster 10 is a unitary structure comprised of a plurality of individual, yet interconnected, UAVs 12, 14, 16. Each type of UAV 12, 14, 16 is specifically configured to perform a different function or type of function. However, regardless of that function, each individual UAV 12, 14, 16 comprises a plurality of motor-driven rotors 18 that provide the UAV 12, 14, 16, as well as the UAV cluster 10, with the ability to fly and maneuver above a ground surface. Further, regardless of their type or function, each individual UAV 12, 14, 16 in UAV cluster 10 is both physically and communicatively interconnected to at least one other individual UAV 12, 14, 16 in UAV cluster 10. Such interconnection, which is described more fully in association with later figures, facilitates the ability of the individual UAVs 12, 14, 16 to communicate with each other, and to share resources with each other on an as-needed basis, while the UAV cluster 10 flies from point to point to deliver payloads.

The UAV cluster 10 may comprise any number and type of individual UAVs 12, 14, 16 needed or desired. According to aspects of the present disclosure, however, the number, type, and position of the individual UAVs 12, 14, 16 within the UAV cluster 10 depends on the particular mission intended for UAV cluster 10. For example, the UAV cluster 10 of FIG. 1 is comprised of a plurality of "mission" UAVs 12 and a plurality of so-called "core UAVs" comprising a plurality of "fuel storage" UAVs 14, and a plurality of "propulsion" UAVs 16. For missions where a large number of individual payloads are to be delivered to a large number of geographically different destination locations, or for missions where a small number of "heavy" payloads are to be delivered to a relatively small number of destination locations, UAV cluster 10 can be configured to include a greater number of mission UAVs 12 designed to carry those "payloads." Should the geographical distance of the destination location(s) meet or exceed a predetermined maximum distance threshold, for example, UAV cluster 10 can be configured to also include various "core UAVs," such as one or more fuel storage UAVs 14 to carry extra fuel for the other UAVs. For missions where UAV cluster 10 requires higher flight velocity and/or greater maneuverability, for example, UAV cluster 10 can include one or more propulsion UAVs 16. These propulsion UAVs 16, as seen in more detail later, comprise additional rotors 18 to help propel UAV cluster 10 faster, higher, and/or a greater distance.

The particular overall "wing" configuration for UAV cluster 10 is also dependent on the type of mission or missions the UAV cluster 10 is to perform. For example, the wing configuration of UAV cluster 10 seen in FIG. 1 is commonly known as a "sweepback" wing. With "sweepback wing" configurations, UAV cluster 10 experiences less drag and higher aerodynamic performance. Configuring the individual UAVs 12, 14, 16 such that they are organized to form UAV cluster 10 in this type of wing configuration is beneficial, for example, in missions where the UAV cluster 10 flies at a higher cruise speeds.

Figure 2:
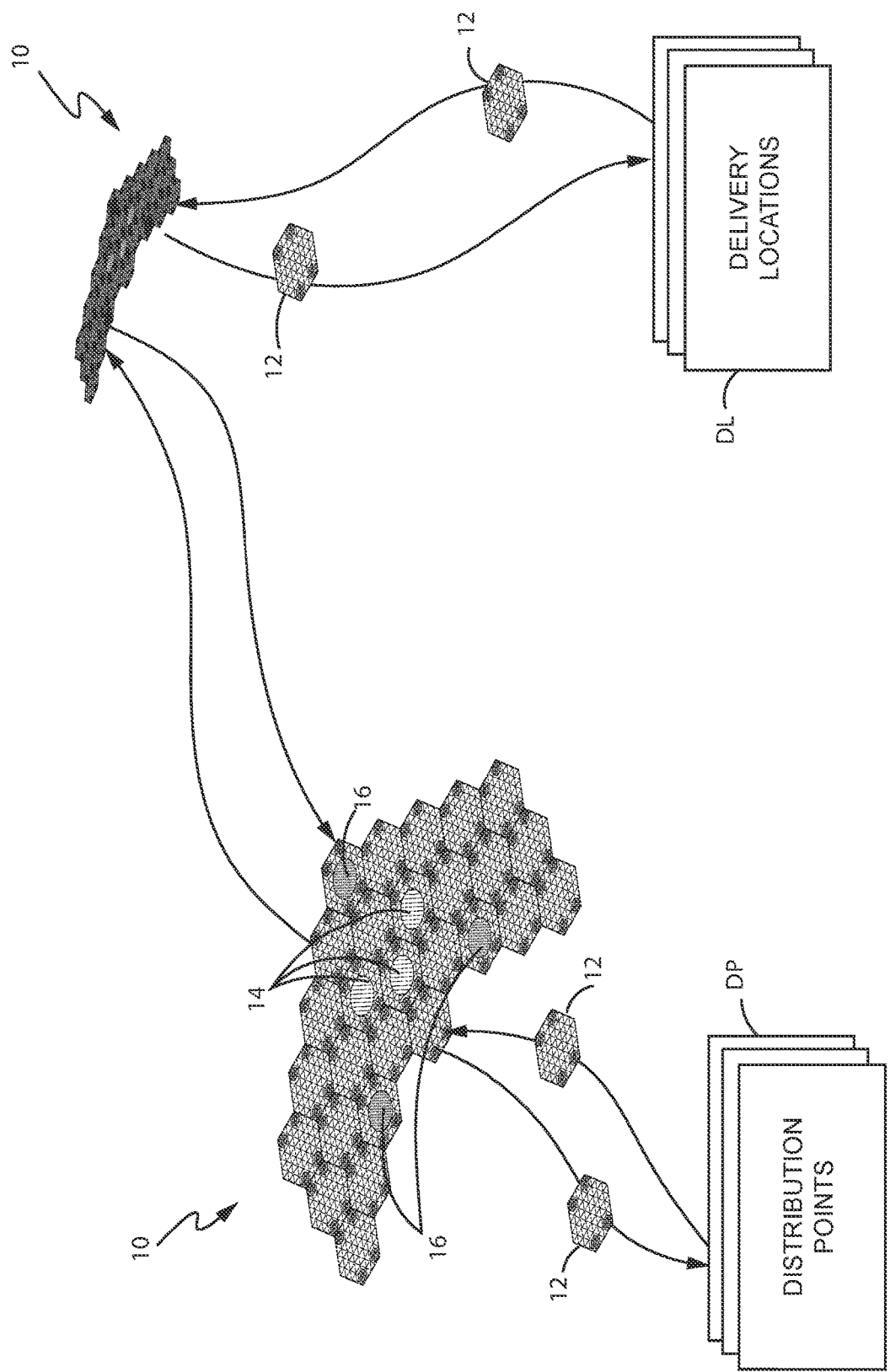
FIG. 2 is a perspective view of a UAV cluster configured according to the present aspects in-flight and delivering one or more payloads to corresponding delivery locations.

FIG. 2 illustrates a UAV cluster 10 configured to perform a mission according to the present disclosure. Particularly, UAV cluster 10 is created to comprise a plurality of individual mission UAVs 12 and a plurality of core UAVs. The core UAVs include fuel storage UAVs 14 and propulsion UAVs 16. In one aspect, the creation of a given UAV cluster 10 occurs "on the ground" at one of the distribution points DP. In these aspects, the individual UAVs 12, 14, 16, for use in creating the UAV cluster 10 are selected and interconnected physically and communicatively while at the distribution location. The UAV cluster 10 is then launched to fly its mission, with the individual mission UAVs 12 detaching from the UAV cluster 10 to deliver their respective payloads to their respective destination locations DL. In other aspects, individual UAVs 12, 14, 16 may be launched from one or more of the distribution points DP and join an already existing UAV cluster 10 in-flight. In these aspects, the individual UAVs 12, 14, 16 are configured to autonomously dock with each other while in-flight and form the physical and communication connections.

The connections formed by the individual UAVs 12, 14, 16 when creating or joining a UAV cluster 10 facilitate data communications between the individual UAVs 12, 14, 16, and allow them to dynamically share their resources with each other. The ability to dynamically share resources between individual UAVs 12, 14, 16 while "in-flight" helps to ensure that both the overall mission of the UAV cluster 10, and the individual missions of the mission UAVs 12 in UAV cluster 10, are successfully completed.

Regardless of where the UAV cluster 10 is created, or how the individual UAVs 12, 14, 16 are selected to create the UAV cluster 10, UAVs 12, 14, 16 are configured to remain together as a single entity to fly with greater efficiency to one or more destination locations DL. Upon arrival, the mission UAVs 12 temporarily detach from the UAV cluster 10 in-flight, deliver their respective payloads to the appropriate destination location DL, and then rejoin the UAV cluster 10 for the return flight back to a distribution point DP. Thus, the individual UAVs comprising the UAV cluster are relasably-coupled.

FIGS. 3A-7B are various views illustrating some exemplary types of individual UAVs that are suitable for use in creating the UAV cluster 10 according to various aspects of the present disclosure. Particularly, an individual UAV can be a rotor-based aircraft or "drone" capable of being controlled independently and/or as part of the UAV cluster 10 by a user and/or control program executing on a processing circuit. In the illustrated embodiment, all individual UAVs are hexagonally-shaped polygons of the same size. As such, the, all individual UAVs used to build a given UAV cluster 10 are congruent (e.g., are identical in form such that the shape coincides when superimposed). Such congruency helps ensure that the individual UAVs will "fit" neatly together to form the UAV cluster 10, facilitates docking and undocking of the individual UAVs with respect to the UAV cluster 10, and allows for the interconnection of individual UAVs in any desired shape of wing. Therefore, the congruency of the individual UAVs in a given UAV cluster 10 ensures that the UAV cluster 10 is both dynamically reconfigurable and dynamically scalable. In other embodiments, other arrangements are possible, for example, the shapes may be similar to one another but not congruent (e.g., have the same shape but a different size)

Those of ordinary skill in the art will readily appreciate that the individual UAVs of the present aspects are not limited solely to the particular hexagonal shape and size seen in the figures. According to other aspects of the disclosure, a UAV cluster 10 could comprise a plurality of individual UAVs shaped like triangles, quadrilaterals, pentagons, octagons, and the like. Thus, other shapes and sizes for the individual UAVs are possible, so long as all individual UAVs in a given UAV cluster 10 are congruent.

Figure 3B:
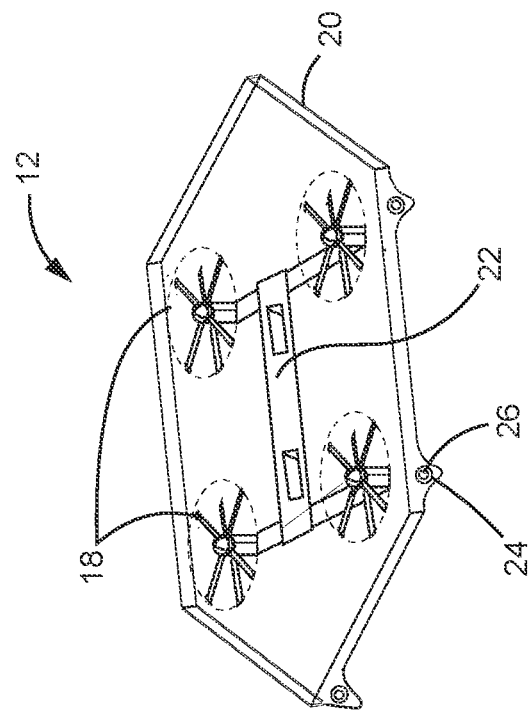
FIGS. 3A-3B are perspective views illustrating a mission UAV configured according to one aspect of the present disclosure.
Figure 3A:
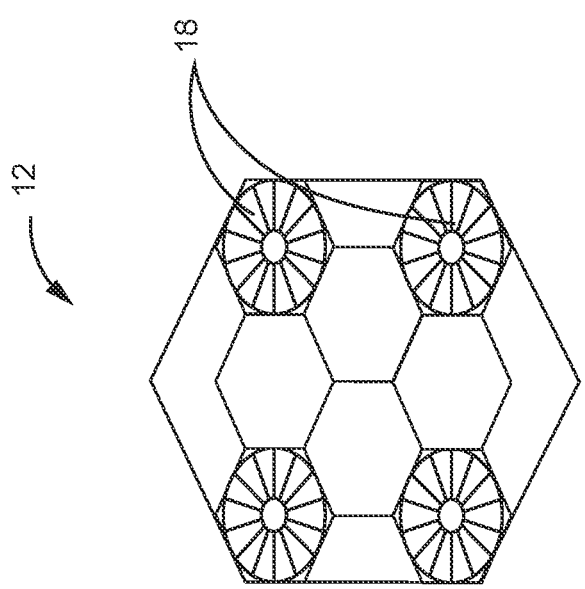

FIGS. 3A-3B illustrate a mission UAV 12 configured according to one aspect of the present disclosure. Mission UAVs 12 are the "workhorses" of UAV cluster 10 as their primary function is to carry and deliver a payload to a predetermined destination location. However, not all mission UAVs 12 in a given UAV cluster 10 need to be utilized to carry a payload. In some aspects, for example, at least some mission UAVs 12 forming a given UAV cluster 10 provide lift capabilities and maneuverability to the UAV cluster 10.

As seen in FIGS. 3A-3B, mission UAV 12 comprises a frame 20 and an infrastructure span 22 configured to carry the weight of a given payload from a distribution point DP to a destination location DL. Frame 20 is manufactured from a rigid or semi-rigid lightweight material and is configured to at least partially protect the component parts of mission UAV 12. The infrastructure span 22 is connected to, and extends between, the interior surfaces of frame 20 and is also manufactured from a lightweight rigid material or semi-rigid material. As seen in these figures, infrastructure span 22 is configured to support at least some of the component parts of mission UAV 12, such as the rotors 18 and their respective motors and control components. Further, the interior of infrastructure span 22 can be at least partially hollow thereby functioning as a pathway for the cables, wires, and/or other connection-related hardware needed by the individual UAVs to communicate and share resources.

As best seen in FIG. 3B, frame 20 also comprises a plurality of docking members 24. In this aspect, the docking members 24 comprise electro-magnets and are controlled by one or more processing circuits to activate and deactivate as needed. In other embodiments, other arrangements for the docking members 24 are possible. For example, the docking members 24 may include the docking mechanism 110 shown in FIG. 14.

When activated, the docking members 24 generate a magnetic field so as to magnetically attract the docking members 24 of other, proximate UAVs 12, 14, 16 in the UAV cluster 10. The docking members 24 then remain activated during flight operations to maintain the desired wing-shape of the UAV cluster 10. Further, each docking member 24 comprises a connection conduit 26 (e.g., one or more wires) to facilitate the data communications and resource sharing with the other UAVs in UAV cluster 10 when mission UAV 12 is docked with the UAV cluster 10.

When deactivated, the docking members 24 repel or cease to attract the docking members 24 of other individual UAVs. Such deactivation allows for the "undocking" of a given mission UAV 12 from the UAV cluster 10 thereby configuring the mission UAV 12 to temporarily detach from the UAV cluster 10 and deliver its payload to a destination location DL. Once the payload has been delivered and the mission UAV 12 returns to dock with UAV cluster 10, the docking members 24 are again activated.

As seen in FIGS. 3A-3B, mission UAV 12 comprises a four-rotor configuration. The rotational velocity, pitch, and yaw of each rotor 18 is independently controllable to change its height and orientation with respect to a ground surface, as well as its speed. However, as will be seen in more detail later, mission UAV 12 is not limited only to a four-rotor configuration. Rather, the mission UAV 12 of the present aspects can have more or fewer rotors as needed or desired.

FIGS. 4A-7B illustrate various types of "core UAVs" suitable for use in aspects of the present disclosure. These so-called "core UAVs" are not mission UAVs 12 in that they are not configured to carry and deliver a payload. Rather, the core UAVs of the present aspects have different specialized functions designed to augment the abilities of the individual UAVs and the UAV cluster, thereby helping to ensure that the UAV cluster 10 and each of the mission UAVs 12 achieve successful mission completion.

Figure 4B:
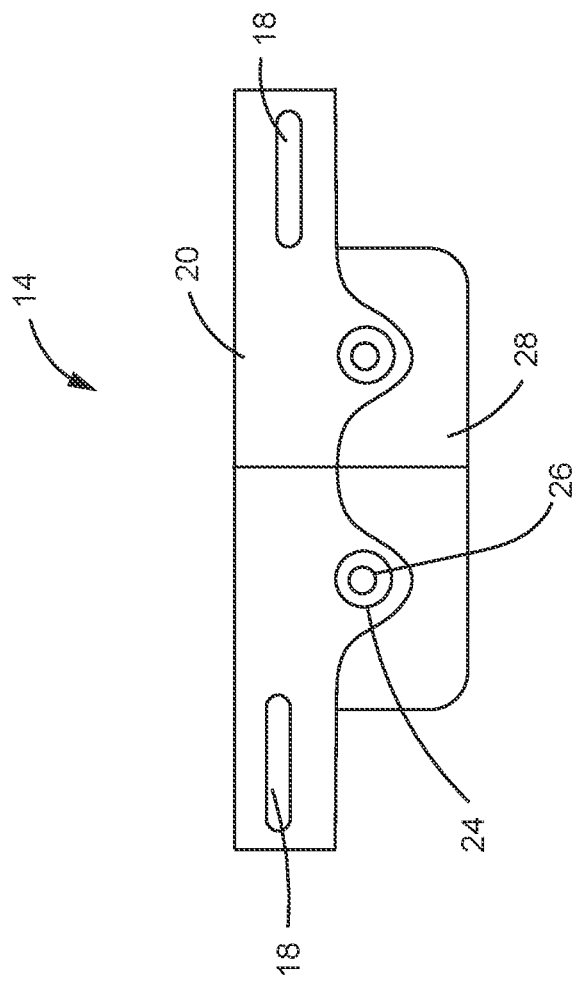
FIGS. 4A-4B are perspective views illustrating a fuel augmentation UAV configured according to one aspect of the present disclosure.
Figure 4A:
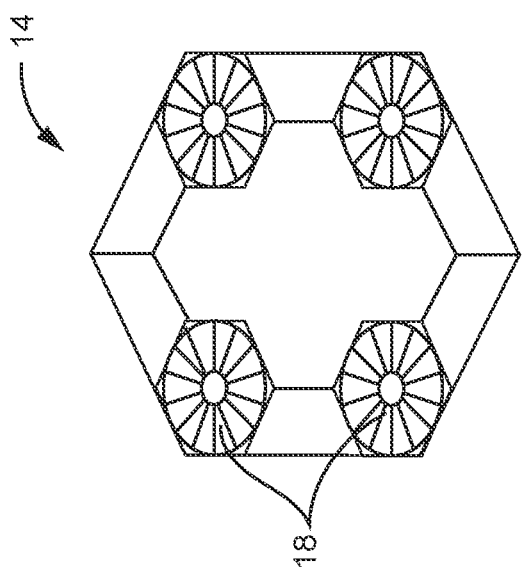

FIGS. 4A-4B illustrate a fuel storage UAV 14 configured to augment a liquid fuel utilized by other UAVs in the UAV cluster 10 according to one aspect of the present disclosure. The fuel storage UAV 14 also comprises a frame 20, an infrastructure span 22, docking members 24, and connection conduits 26. In addition, however, fuel storage UAV 14 also comprises a fuel reservoir 28 configured to carry an amount of liquid fuel, such as gasoline, for example. In more detail, the fuel storage UAV 14 of this aspect is not configured to carry a deliverable payload, as are the mission UAVs 12. Rather, the fuel storage UAVs 14 are configured to augment the fuel storage capacity of the individual UAVs 12, 14, 16 thereby extending flight distance and time.

In operation, a control circuit (described later) receives requests for additional fuel from one or more UAVs in UAV cluster 10. In response to the requests, the fuel storage UAV 14 is controlled to provide the requested fuel from fuel reservoir 28 to the particular requesting UAV. The fuel can, for example, be pumped through conduits or passages formed in frame 20 and infrastructure span 22 (shown in FIG. 3B).

According to the present disclosure, a given UAV cluster 10 can be configured to include one or more of these fuel storage UAVs 14 based on its particular mission. For example, a UAV cluster 10 configured to fly a long distance mission may be created, as previously described, to include multiple fuel storage UAVs 14. The longer the distance the UAV cluster 10 is to fly, the more fuel storage UAVs 14 the UAV cluster 10 can contain. Further, the positioning of multiple fuel storage UAVs 14 within the UAV cluster 10 depends on the UAV cluster 10 mission as well as on the particular wing configuration for the UAV cluster 10. In general, the fuel storage UAVs 14 are positioned within the UAV cluster 10 to ensure an appropriate weight distribution for the UAV cluster 10.

Figure 5B:
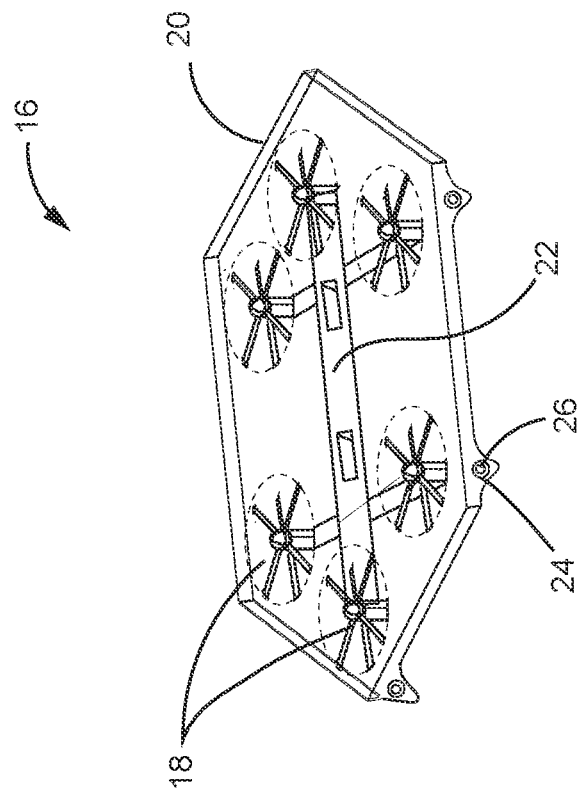
FIGS. 5A-5B are perspective views illustrating a propulsion augmentation UAV configured according to one aspect of the present disclosure.
Figure 5A:
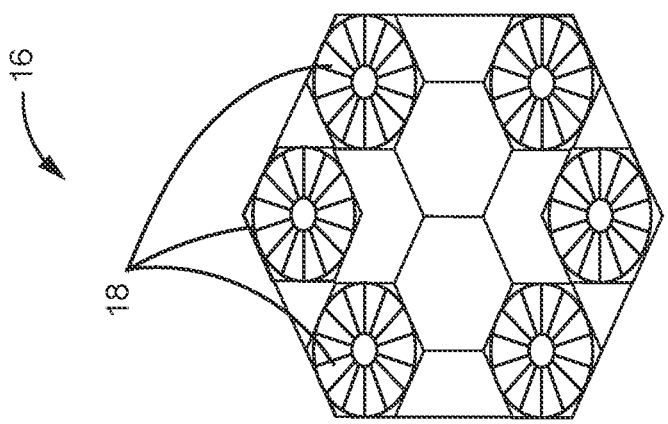

FIGS. 5A-5B illustrate a type of "core" or special-function UAV known as a propulsion UAV 16 according to one aspect of the present disclosure. In addition to the frame 20, infrastructure span 22, docking members 24, and communication conduits 26, each of which was previously described, propulsion UAV 16 comprises an additional set of rotors 18. As above, the rotors 18 are independently controllable thereby facilitating the requisite control over the flight characteristics of UAV cluster 10 during flight.

Figure 6B:
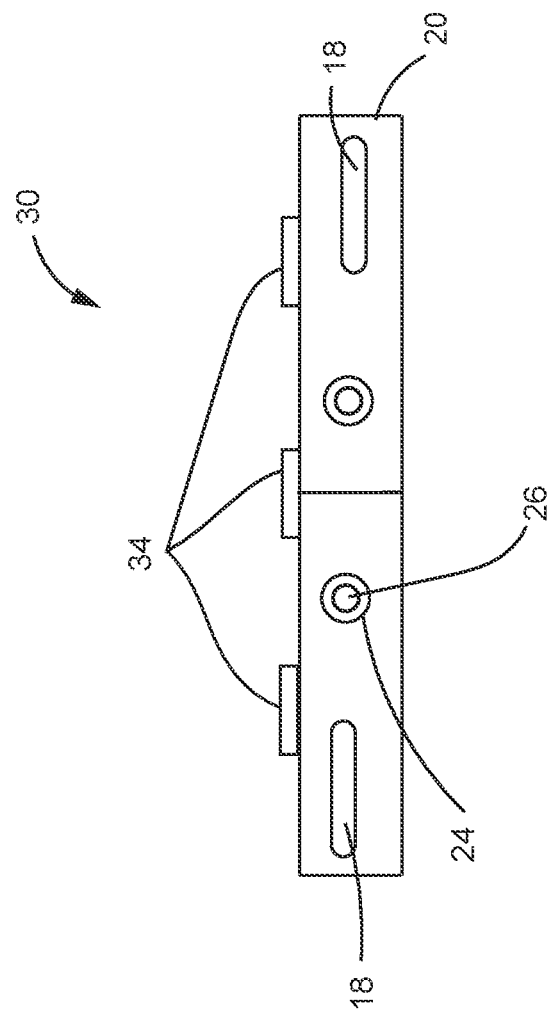
FIGS. 6A-6B are perspective views illustrating a power augmentation UAV configured according to one aspect of the present disclosure.
Figure 6A:
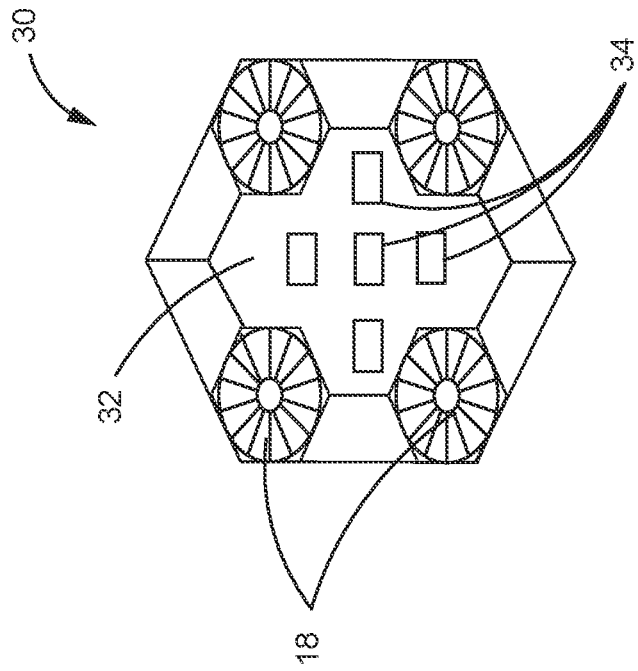

FIGS. 6A-6B illustrate another "core" or special-function UAV referred to herein a power UAV 30. The power UAV 30 is similarly structured to the other UAVs in that power UAV 30 also comprises a frame 20, an infrastructure span 22, a plurality of docking members 24, and communication conduits 26. In addition, however, the power UAV 30 also comprises a plurality of electrical energy sources, such as batteries 34, for example, mounted to a platform 32 spanning between the frame 20. In operation, the power UAV 30 is controlled to provide electrical power generated by the batteries 34 to one or more of the other UAVs in UAV cluster 10 upon request. The UAVs in UAV cluster 10 receiving the power can then utilize that power to augment their own individual power supply.

As seen in FIGS. 6A-6B, the power UAV 30 comprises a plurality of batteries 34. However, those of ordinary skill in the art should appreciate that the present disclosure is not so limited. By way of example only, power UAV 30 can comprise one or more solar cells designed to generate electricity from light in addition to, or in lieu of, batteries 34. In aspects where the power UAV 30 comprises both, the solar cells can be employed to recharge batteries 34 and/or provide a direct electrical current to the components of another UAV in UAV cluster 10.

Figure 7B:
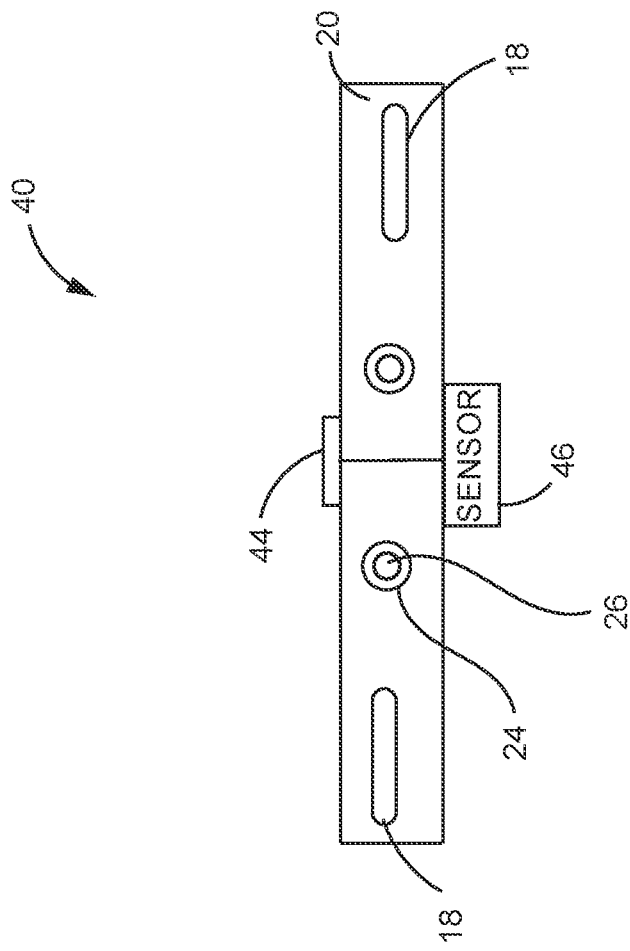
FIGS. 7A-7B are perspective views illustrating a sensor UAV configured to sense a surrounding environment according to one aspect of the present disclosure.
Figure 7A:
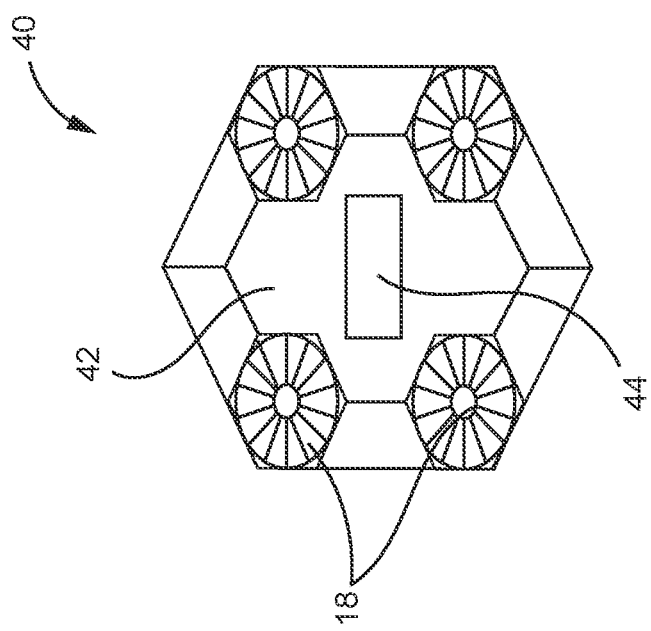

FIGS. 7A-7B illustrate another type of special-function UAV suitable for use in various aspects of the present disclosure. In this aspect, a sensor UAV 40 comprises frame 20, infrastructure span 22, rotors 18, docking members 24, and communication conduits 26, but also comprises a sensor 46 mounted to a platform 42. The sensor 46 is configured to sense a surrounding environment of the UAV cluster 10. According to various aspects, the sensor 46 can comprise any sensor known in the art including, but not limited to, a camera, an infra-red sensor, thermal sensor, microphone, motion sensor, and the like, or any combination thereof. Additionally, sensor UAV 40 can also comprise control circuitry 44 mounted to platform 42, which can include memory circuitry, configured to control the operation of sensor 46 when the sensor UAV 40 is detached from the UAV cluster 10. In aspects where the control circuitry 44 also comprises memory circuitry, sensor UAV 40 can store images, video, audio, and/or other artifacts until it returns to UAV cluster 10 and/or distribution point DP. In some aspects, UAV cluster 10 also includes a UAV comprising memory circuitry that stores artifacts sensed by sensor 46. In these cases, the artifacts can be transferred between UAVs via the communication conduit 26.

Figure 8:
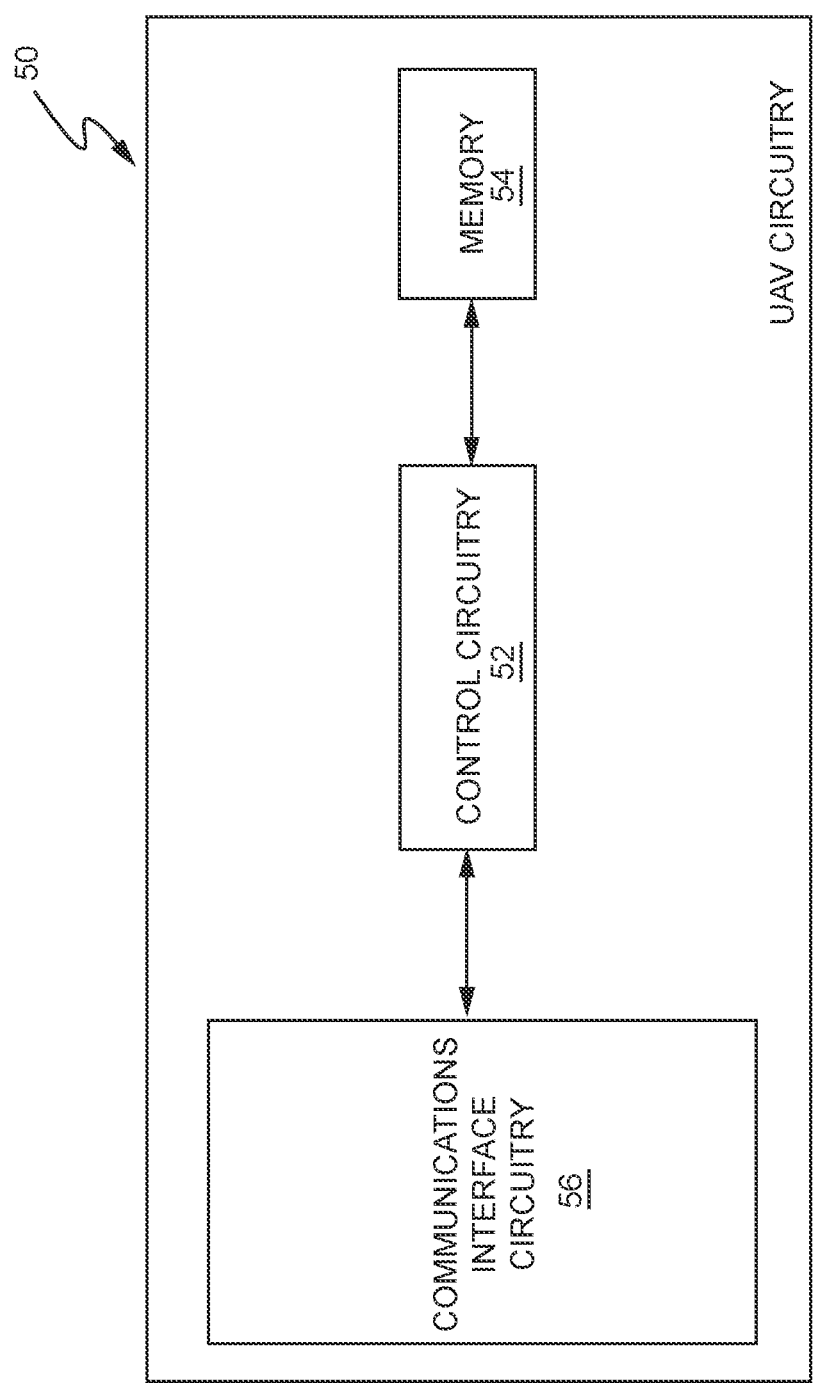
FIG. 8 is a functional block diagram illustrating some components of the UAV control circuitry according to one aspect of the present disclosure.

FIG. 8 is a functional block diagram illustrating some components of the UAV circuitry 50 carried by each individual UAV in UAV cluster 10. As seen in FIG. 8, the UAV circuitry 50 of each UAV comprises at least control circuitry 52, a memory 54, and communications interface circuitry 56. The control circuitry 52 comprises, for example, a microprocessor and controls the operation of the UAV in accordance with executing a control program stored in memory 54. The control program can, for example, define the mission assigned to the UAV cluster 10 as a whole and/or to the UAV individually. Where the UAV is a core UAV, such as a fuel storage UAV 14, for example, the control circuitry 52 receives and responds to requests for fuel (or other resources). When responding, the control circuitry 52 is also configured to control its fuel reservoir 28 to provide fuel to the requesting UAV. The communications interface circuitry 56 provides the communications between the various UAVs in UAV cluster 10.

Figure 9:
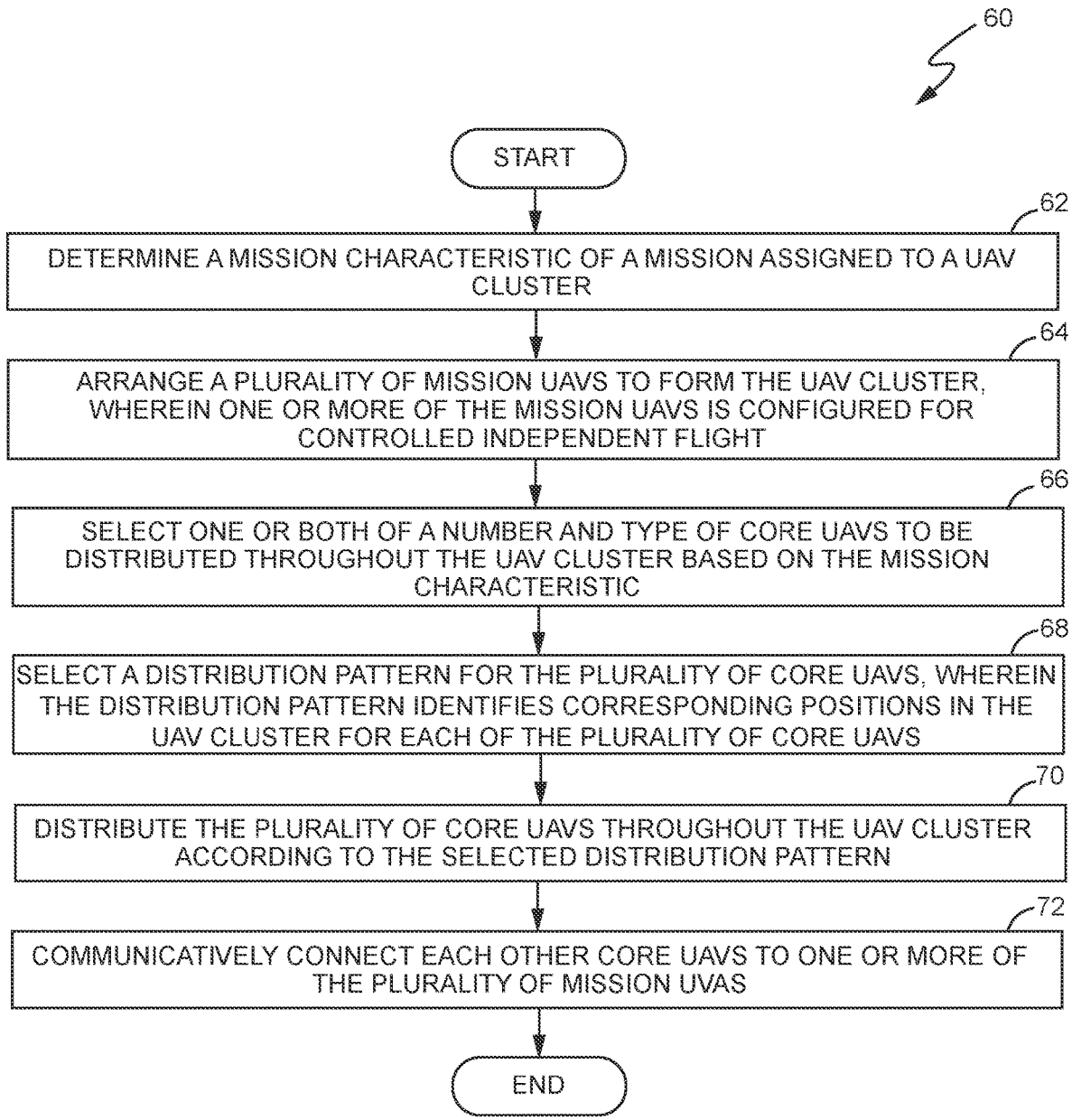
FIG. 9 is a flow chart illustrating a method for creating and configuring a UAV cluster according to a mission for the UAV cluster according to one aspect of the present disclosure.

FIG. 9 is a flow chart illustrating a method 60 for creating and configuring a UAV cluster 10 based on its mission according to one aspect of the present disclosure. Method 60 begins by determining a mission characteristic for a mission assigned to a UAV cluster 10 (box 62). By way of example, the overall mission of the UAV cluster 10 may be to deliver a single, large, relatively heavy payload to a distant destination location DL. Alternatively, the mission may be to deliver multiple smaller payloads to different destination locations DL that are geographically close to each other and to a launching point of the UAV cluster 10. In still another example, the mission may be that the UAV cluster 10 flies towards a predetermined destination location DL, and releases a sensor UAV 40 to capture images of that destination location DL. Regardless of the mission, however, method 60 arranges a plurality of mission UAVs 12 to form the UAV cluster 10 based on the mission (box 64).

Then, one or both of a number and type of the "core" or special-function UAVs 14, 16, 30, 40, are selected based on the mission characteristic for distribution throughout UAV cluster 10 (box 66). For example, missions that require additional fuel will likely select one or more fuel UAVs 14 to augment the fuel supply of the other UAVs in UAV cluster 10. Missions that require the capture of images will select one or more sensor UAVs 40 for inclusion in UAV cluster 10. Once the appropriate "core" or special-function UAVs have been selected, however, a distribution pattern is selected for those UAVs (box 68). The distribution pattern identifies corresponding positions for each core UAV selected for inclusion in the UAV cluster 10. The UAVs are then distributed throughout the UAV cluster 10 according to the selected distribution pattern (box 70), and communicatively connected to each other and to one or more of the plurality of mission UAVs (box 72).

Those of ordinary skill in the art should appreciate that the distribution pattern selected for the core UAVs is not limited solely to a distance the UAV cluster 10 must fly to one or more destination locations DL. Rather, there are other factors considered when selecting a distribution pattern. For example, a type of mission that the UAV cluster 10, or a set of one or more mission UAVs 12 in the UAV cluster 10, is intended to perform, can also be considered when selecting a distribution pattern for the core UAVs. That is, a mission to capture images of an object or perform some other sensory function will likely mean that one or more sensor UAVs 40 will be distributed so as to obtain a clear line of sight to the object. A mission having one or more intermediate waypoints between the distribution point DP and a destination location DL could mean that UAV cluster 10 will include fewer fuel storage UAVs 14 if the intermediate waypoints are capable of refueling the UAV cluster 10, or more fuel storage UAVs 14 if the intermediate waypoints are not capable of refueling the UAV cluster 10. In either case, the distribution pattern for the fuel storage UAVs 14 could be selected to reflect an even weight distribution and/or to ensure close proximity of the fuel storage UAVs 14 and the UAVs they would refuel. Another factor that may be considered is a characteristic of the payload to be carried by the UAV cluster 10. For example, heavier payloads may require additional propulsion UAVs 16 distributed symmetrically across the UAV cluster 10 so as to ensure the mission UAVs 12 are capable of carrying the payload to the destination location DL. In some aspects, multiple factors are considered when selecting the number and types of core UAVs to be included in the UAV cluster 10, as well as determining an appropriate distribution pattern for the core UAVs.

Figure 10:
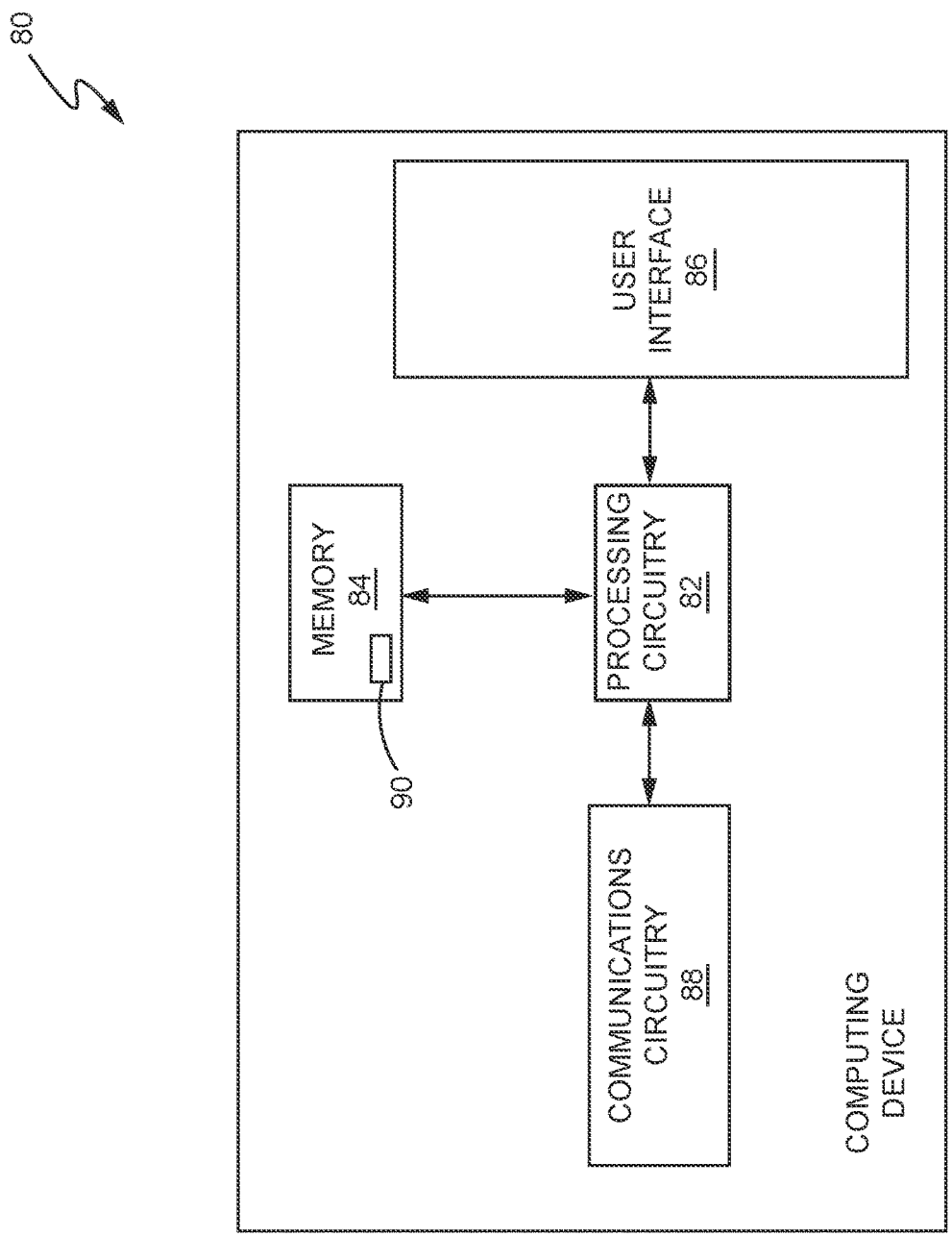
FIG. 10 is a functional block diagram illustrating component parts of a UAV in a UAV cluster according to one aspect of the present disclosure.

FIG. 10 is a functional block diagram illustrating some component parts of a computing device 80 configured to implement method 60 according to one aspect of the present disclosure. As seen in FIG. 10, the computing device 80 comprises processing circuitry 82, memory 84, a user interface 86, and communications circuitry 88.

According to various aspects of the present disclosure, processing circuitry 82 comprises one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. Thus, in one aspect, processing circuitry 82 includes programmable hardware capable of executing software instructions stored, e.g., as a machine-readable computer control program 90 in memory 84. Processing circuitry 82 is configured to execute control program 90 to perform the previously described aspects of the present disclosure. This includes determining a characteristic of a mission being assigned to UAV cluster 10, and based on that characteristic, selecting the number and type of individual UAVs that are to comprise the UAV cluster 10, and determining a distribution pattern for the selected "core" UAVs. So determined, the UAV cluster 10 can be built with the core UAVs being distributed in accordance with the selected distribution pattern.

Memory 84 comprises any non-transitory machine-readable storage media known in the art or that may be developed, whether volatile or non-volatile, including (but not limited to) solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, individually or in any combination. As seen in FIG. 10, memory 84 is configured to store a computer program product (e.g., control program 90) comprising the instructions executed by processing circuitry 82 to perform the previously described aspects of the present disclosure. Additionally, memory 84 is configured to store various information and data, such as the rules for selecting the number and types of individual UAVs to be used to build UAV cluster 10, as well as the respective distribution patterns for the core UAVs.

The user interface 86 comprises circuitry configured to control the input and output (I/O) data paths of the computing device 80. The I/O data paths include those used for exchanging signals with a user. For example, in some aspects, the user interface 86 comprises various user input/output devices including, but not limited to, one or more display devices, a keyboard or keypad, a mouse, and the like. Using these, a user of computing device 80 is able to select a mission to be assigned to a given UAV cluster 10, as well as input any parameters needed to ensure UAV cluster 10 completes its assigned mission successfully.

The communications circuitry 88 comprises circuitry configured to allow the computing device 80 to communicate data and information with one or more other devices via a communications network (not shown). Generally, communications circuitry 88 comprises an ETHERNET card or other circuit specially configured to allow computing device 80 to communicate the data and information. However, in other aspects of the present disclosure, communications circuitry 88 includes a transceiver configured to send and receive communication signals to and from another device via a wireless communications network. In aspects of the present disclosure, computing device 80 utilizes communications circuitry 88 to communicate signals and data regarding an assigned mission to UAV cluster 10, as well as to one or more of the individual UAVs comprising the UAV cluster. By way of example, computing device 80 may communicate signals and data to various mission UAVs 12 in UAV cluster 10 to specifically configure those mission UAVs 12 to carry out their respective individual missions.

As previously described, the present disclosure does not limit creating a UAV cluster 10 to any particular type of wing. Nor does the present disclosure limit the creation of a UAV cluster 10 to any particular type and/or number of individual UAVs. Rather, the aspects of the present disclosure can be utilized to create a UAV cluster 10 to form any wing shape, and further, to include any type and number of constituent UAVs. As stated above, these particular aspects are determined based on a knowledge of the mission that is to be assigned to the UAV cluster 10, as well as on knowledge of the missions to be assigned to the individual UAVs that comprise the UAV cluster 10.

Figure 11:
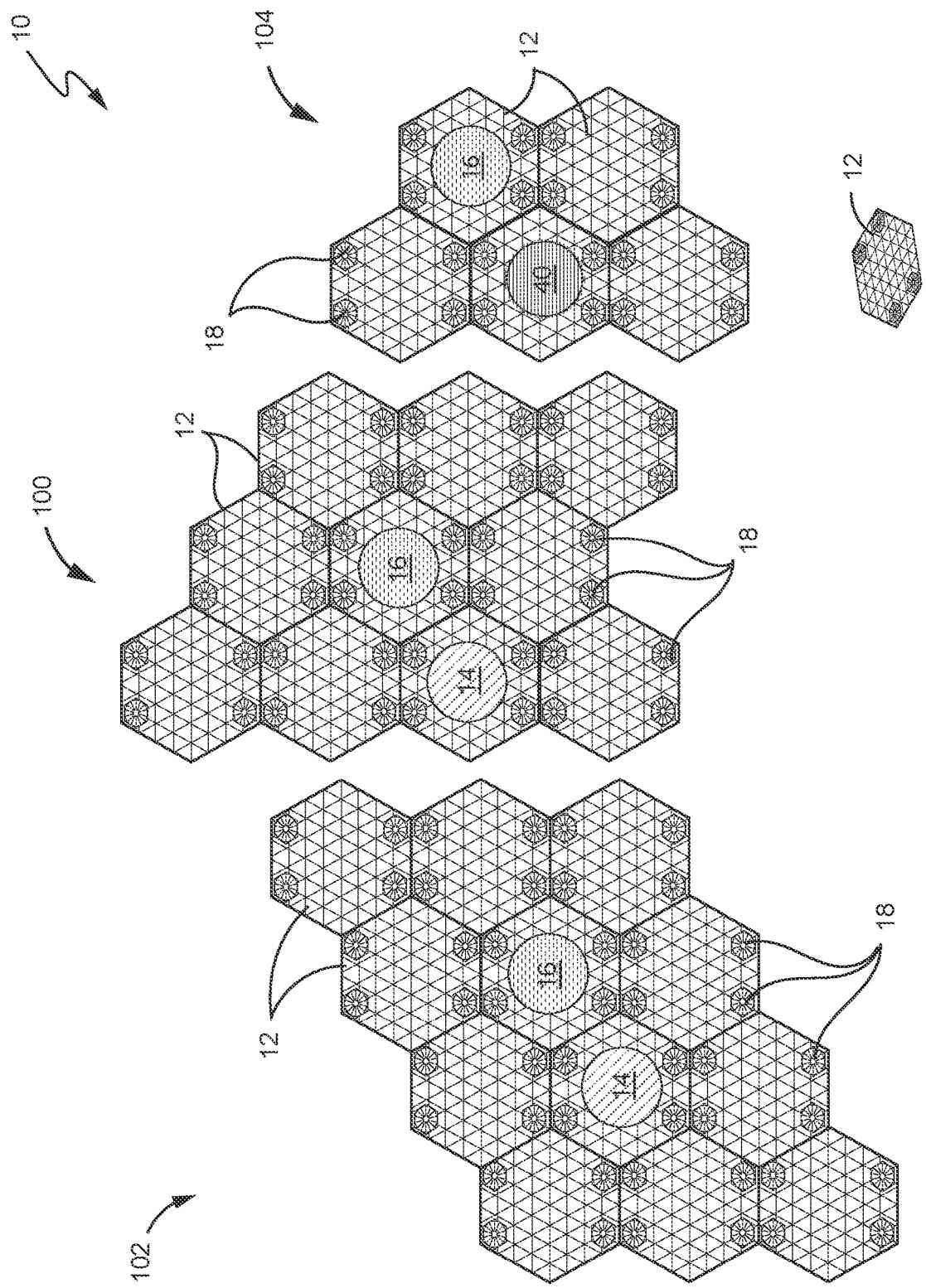
FIG. 11 is a perspective view of a UAV cluster configured according to another aspect of the present disclosure.
Figure 12:
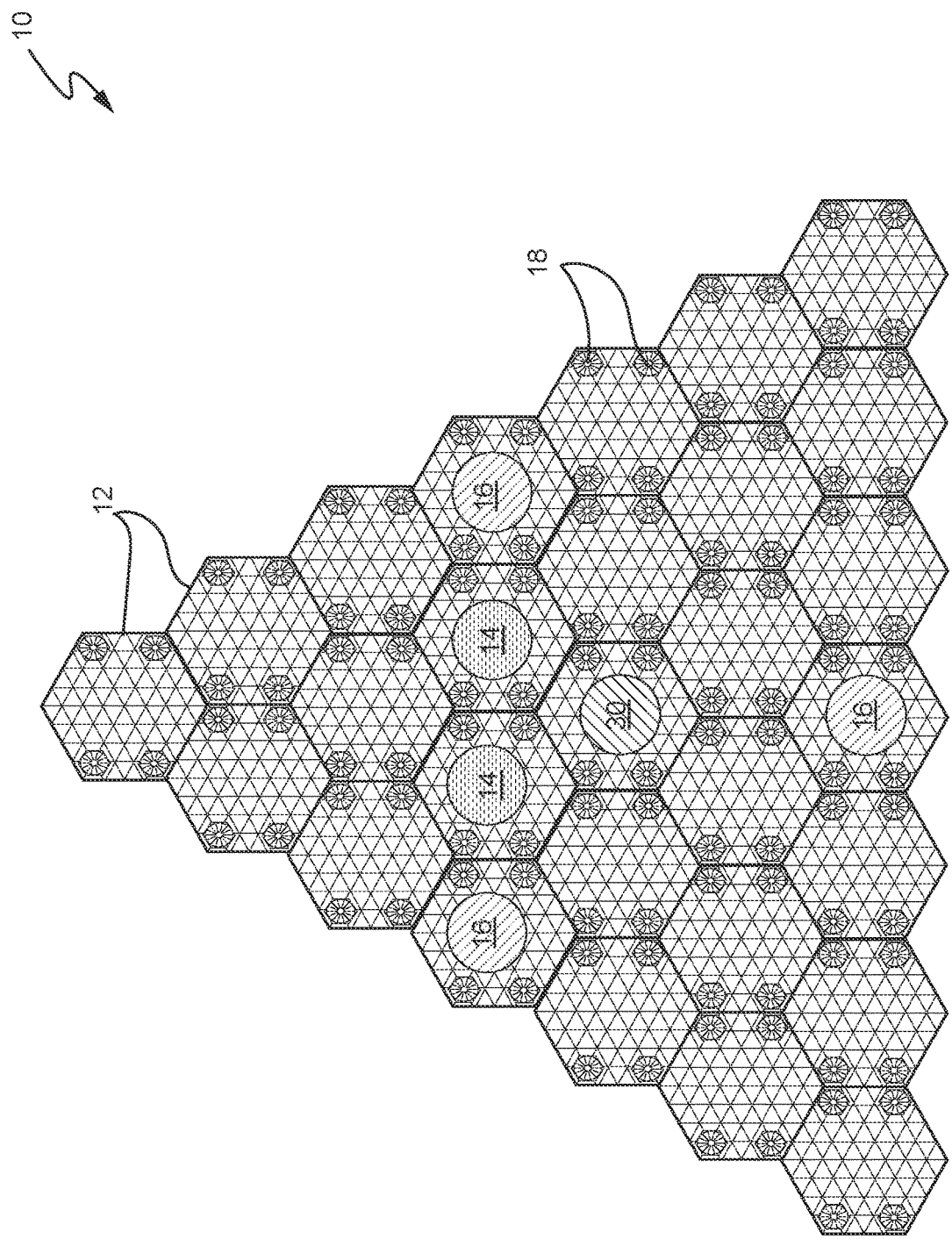
FIG. 12 is a perspective view of a UAV cluster configured according to another aspect of the present disclosure.
Figure 13:
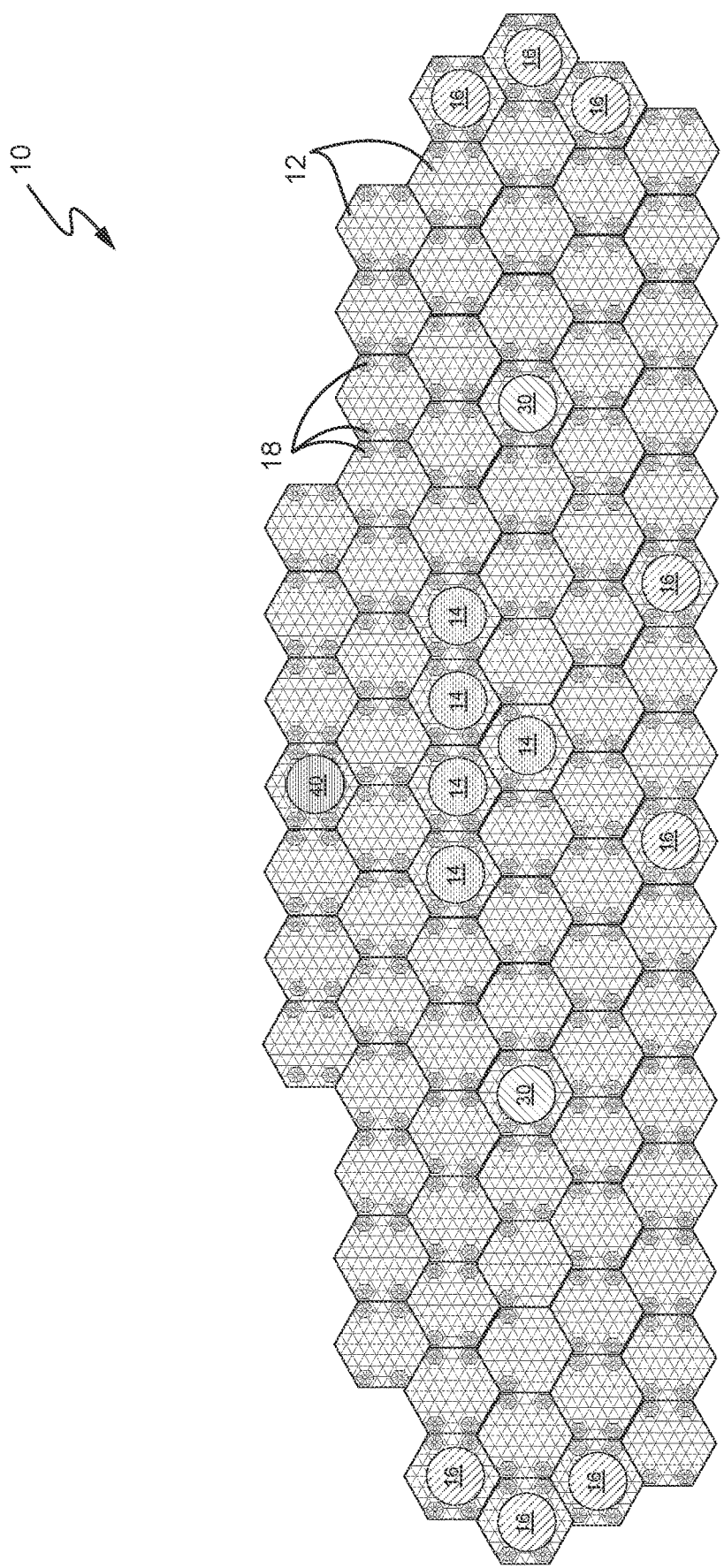
FIG. 13 is a perspective view of a UAV cluster configured according to another aspect of the present disclosure.

To that end, FIGS. 11-13 illustrate a UAV cluster 10 formed according to other aspects of the present disclosure. Particularly, FIG. 11 illustrates a UAV cluster 100 as comprising a plurality of mission UAVs 12, and a plurality of "core" UAVs. In this aspect, the core UAVs comprise a fuel storage UAV 14, a propulsion UAV 16, and a sensor UAV 40. Further, in this aspect, the UAV cluster 10 is configured to separate into UAV sub-clusters 100, 102, 104. Each UAV sub-cluster 100, 102, 104 is configurable to support the UAV cluster 10 mission as a whole, but is also configured to fly its own mission. For example, a mission UAV 12 can undock from UAV sub-cluster 104 in-flight to fly to its own predetermined destination location DL and deliver its payload. Meanwhile, the remaining UAVs in UAV sub-cluster 104 (i.e., the remaining mission UAVs 12, and the sensor UAV 40) will continue on the mission assigned to the UAV sub-cluster 104. Upon completion of the missions, the undocked mission UAV 12 will return to once again dock with the UAV sub-cluster 104 for its return flight, as previously described.

In this aspect, each of the UAV sub-clusters 100, 102, 104 are independently controllable to perform their respective missions. Thus, the inclusion of a number and type of core UAVs in each UAV sub-cluster 100, 102, 104, as well as the distribution pattern for those core UAVs in the UAV sub-clusters 100, 102, 104, is determined based on a characteristic of the mission assigned to the UAV sub-cluster 100, 102, 104. Additionally, however, each UAV sub-cluster 100, 102, 104 is capable of controlling its own mission directives when separated from the other UAV sub-clusters 100, 102, 104.

By way of example, a first core UAV (e.g., propulsion UAV 16) in UAV sub-cluster 100 may be configured as a "master UAV" to control all UAVs in the UAV cluster 10 when all UAV sub-clusters 100, 102, 104 are docked together. Thus, the other core UAVs (e.g., the propulsion UAVs 16 in UAV sub-clusters 102 and 104, respectively) are controlled by the master UAV in this configuration. However, upon separating from the UAV cluster 10, each of the propulsion UAVs 16 in the UAV sub-clusters 100, 102, 104 would act as its own "master UAV" for that UAV sub-cluster 100, 102, 104 while separated from the other UAV sub-clusters 100, 102, 104 of UAV cluster 10. Upon re-docking, the propulsion UAV 16 of UAV sub-cluster 92 would autonomously regain its "master UAV" status for the UAV cluster 10.

FIG. 12 is a top-down view of a UAV cluster 10 configured according to another aspect of the present disclosure. In this aspect, UAV cluster 10 has a "delta" wing shape. This wing shape is very efficient and provides a large wing area thereby reducing load on the wing and increasing maneuverability. As seen in FIG. 11, the UAV cluster 10 comprises a plurality of mission UAVs 12, a plurality of fuel storage UAVs 14, a plurality of propulsion UAVs 16, and a power UAV 30 configured to augment the electrical power capabilities of the other UAVs in UAV cluster 10.

FIG. 13 is a perspective view of a UAV cluster 10 having an "elliptical" wing shape according to another aspect of the present disclosure. Elliptical wing shapes may be advantageous in certain conditions by providing greater lift with less drag than other wing shapes. As seen in FIG. 13, UAV cluster 10 comprises a plurality of mission UAVs 12, a plurality of fuel storage UAVs 14, a plurality of propulsion UAVs 16, and a power UAV 30 configured to augment the electrical power capabilities of the other UAVs in UAV cluster 10.

UAV clusters 10 that are created according to the present disclosure provide benefits that conventionally created UAV clusters do not provide. Particularly, by generating the UAV cluster 10 to include selected "core" UAVs and determining their distribution pattern in the UAV cluster 10 according to a characteristic of the mission, UAV cluster 10 achieves greater cost effectiveness than its conventional counterparts when transporting payloads to one or more destination locations DL. Moreover, the structure of the UAV clusters 10 are scalable and reconfigurable in-flight. Such abilities easily facilitate "just-in-time" planning for delivering payloads using UAV clusters. Additionally, even if a mission assigned to a given UAV cluster 10 changes after it has been launched, aspects of the present disclosure allow the individual UAVs comprising the UAV cluster 10 to be rearranged, replaced, or augmented according to any new mission parameters. In particular, the computing device 80 previously described can, in one aspect, determine a new UAV make-up and distribution pattern for the UAV cluster 10 while the UAV cluster 10 is in-flight, and cause reconfiguration instructions to be transmitted to the UAV cluster 10.

Aspects of the present disclosure further include various methods and processes, as described herein, implemented using various hardware configurations configured in ways that vary in certain details from the broad descriptions given above. For example, the docking members 24 of the previously discussed aspects of the disclosure comprise electromagnets disposed on frame 20. The docking members 24 in these aspects are controlled by one or more processing circuits to activate to allow docking with one or more other UAVs (e.g., any of UAVs 12, 14, 16, 30, 40) to form a UAV cluster 10, and to deactivate to allow undocking from the other UAVs in UAV cluster 10. However, as those of ordinary skill in the art will appreciate, the present disclosure is not limited to the use of electro-magnets on a frame of a UAV to facilitate docking and undocking. In other aspects of the present disclosure, each of the UAVs comprises a self-aligning docking mechanism that is controlled to engage and disengage the self-aligning docking mechanism of another UAV in the UAV cluster 10. In other words, certain embodiments may use one or more different types of docking mechanisms.

FIGS. 14A-14B and 15A-15B, for example, illustrate one such self-aligning docking mechanism 110 according to one aspect of the present disclosure in the context of a pair of UAVs 12a, 12b. Such docking mechanisms can be utilized on any UAV regardless of type, and therefore, the specific illustration of the UAVs as being UAV 12 is merely for illustrative purposes. Further, while each UAV 12a, 12b comprises its own self-aligning docking mechanism 110, the following text describes the self-aligning docking mechanism 110 in terms of a single UAV 12a for clarity and ease of discussion.

As seen these figures, the self-aligning docking mechanism 110 of UAV 12a comprises a pair of edge extension clevises 112a, an arm 114a extending from each edge extension clevis 112a, electro-magnetic members 116a disposed at a terminal end of the arms 114a, a pair of docking alignment control circuits 118a, and a flexible seal 120a attached to the frame 20a of UAV 12a. Additionally, the self-aligning docking mechanism 110 comprises a docking-jaw servo control circuit 122a, a clocking polar servo drive circuit 124a, a bearing-bushing member 126a fixedly coupled to the frame 20a, and a rotatable docking jaw 130a coupled to the bearing-bushing member 126a. The rotatable docking jaw 130a of this aspect further comprises a pair of opposable grippers 132, 134 that, as seen in more detail later, are configured to move between an open position for undocking, and a closed position for docking.

For docking operations, the UAVs 12a, 12b are first flown so that they are in close proximity to each other. In one aspect, such movement is manually controlled by an operator using a controller. In other aspects, each UAV 12a, 12b autonomously controls its own movement toward the other without the need for operator intervention. In some aspects, the movement of one UAV 12a, 12b towards the other UAV 12a, 12b is controlled by both the operator and the UAVs 12a, 12b. By way of example, the operator may manually control UAV 12a to move toward UAV 12b until the UAVs 12a, 12b are within a predetermined distance of each other. Once within the predetermined distance, the UAVs 12a, 12b can be configured to complete the docking procedure autonomously. Regardless of whether an operator provides any manual control, however, each UAV 12a, 12b is configured to communicate with the other to provide information and data required for docking. The information and data exchanged by the UAVs 12a, 12b includes, but is not limited to, their respective IDs, positions, and orientations relative to each other.

The UAVs 12a, 12b are configured to implement the docking procedure in multiple stages or phases. During a first stage, a "gross alignment" between the UAVs 12a, 12b is achieved in which the UAVs 12a, 12b are generally, but not precisely, aligned. Particularly, in one aspect, each UAV 12a, 12b extends its arms 114a, 114b from their respective edge extension clevis 112a, 112b towards the other. Sensors on the UAVs 12a, 12b can assist with detecting the UAV, and with the initial positioning of the UAVs 12a, 12b relative to each other. The electro-magnetic members 116a, 116b on each arm 114a, 114b are then energized to attract each other. Once the electro-magnetic members 116a, 116b contact each other, the gross alignment stage is complete with the two UAVs 12a, 12b coupled together.

As stated above, even though the UAVs 12a, 12b are coupled and in gross alignment with one another, their respective docking mechanisms are still not precisely aligned. Thus, aspects of the present disclosure configure the UAVs 12a, 12b to implement a second stage in which the docking jaws 130a, 130b self-align to refine the gross alignment. Particularly, once the electro-magnetic members 116a, 116b are in contact, or are very near such contact, the docking alignment control circuits 118a, 118b detect each other. In this aspect, the docking alignment control circuits 118a, 118b comprise electro-optic alignment control circuits that emit light. Each docking alignment control circuit 118a, 118b detects the light emitted by the other, and sends corresponding alignment signals to its respective docking-jaw servo control circuit 122a, 122b. Based on the signals received from the docking alignment control circuits 118a, 118b, each docking-jaw servo control circuit 122a, 122b determines whether its respective docking jaw 130a, 130b are sufficiently aligned with each other, or whether further refined alignment is required. Should refined alignment be required, each docking-jaw servo control circuit 122a, 122b sends alignment signals to its corresponding clocking polar servo drive circuit 124a, 124b. In response, each clocking polar servo drive circuit 124a, 124b generates command signals to rotate their respective docking jaws 130a, 130b in one direction or the other to achieve a more precise alignment.

According to one aspect of the present disclosure, the rotation of the docking jaws 130a, 130b is complementary. That is, while the clocking polar servo drive circuit 124a of UAV 12a generates control signals that rotate docking jaw 130a about an axis l in a first direction (e.g., a clockwise direction), the clocking polar servo drive circuit 124b of UAV 12b generates complementary control signals to rotate docking jaw 130b about axis l in a second direction opposite the first direction (e.g., a counter-clockwise direction). Further, determining the particular rotational direction for each docking jaw 130a, 130b can be accomplished in a variety of ways. In one aspect, for example, the direction of rotation for each docking jaw 130a, 130b is determined via messaging between the UAVs 12a, 12b. Particularly, the clocking polar servo drive circuit 124a can send a message to clocking polar servo drive circuit 124b indicating the direction in which it will cause docking jaw 130a to rotate. Upon receipt, clocking polar servo drive circuit 124b will also generate one or more signals to rotate docking jaw 130b, but in the opposite direction.

In another aspect of the disclosure, each clocking polar servo drive circuit 124a, 124b generates one or more control signals to rotate its respective docking jaw 130a, 130b to a predefined position. In such predefined positions, the grippers 132, 134 of docking jaw 130a are offset at about 90° relative to the grippers 136, 138 of docking jaw 130b (see FIGS. 15A-15B).

Regardless of the particular method employed, however, the two-stage method for aligning the docking jaws 130a, 130b according to the present disclosure preserves energy resources. More specifically, arms 114a, 114b and electromagnetic members s 116a, 116b provide a rudimentary alignment of the UAVs 12a, 12b during the first stage to permit the docking jaws 130a, 130b to generally align with each other. While such alignment is not precise, and thus may not be entirely sufficient for docking, it is sufficient with which to place the grippers 132, 134, 136, and 138 into general alignment with each other. This reduces the amount of power expended during the second stage to rotate the grippers 132, 134, 136, 138 into precise alignment.

Figure 14A:
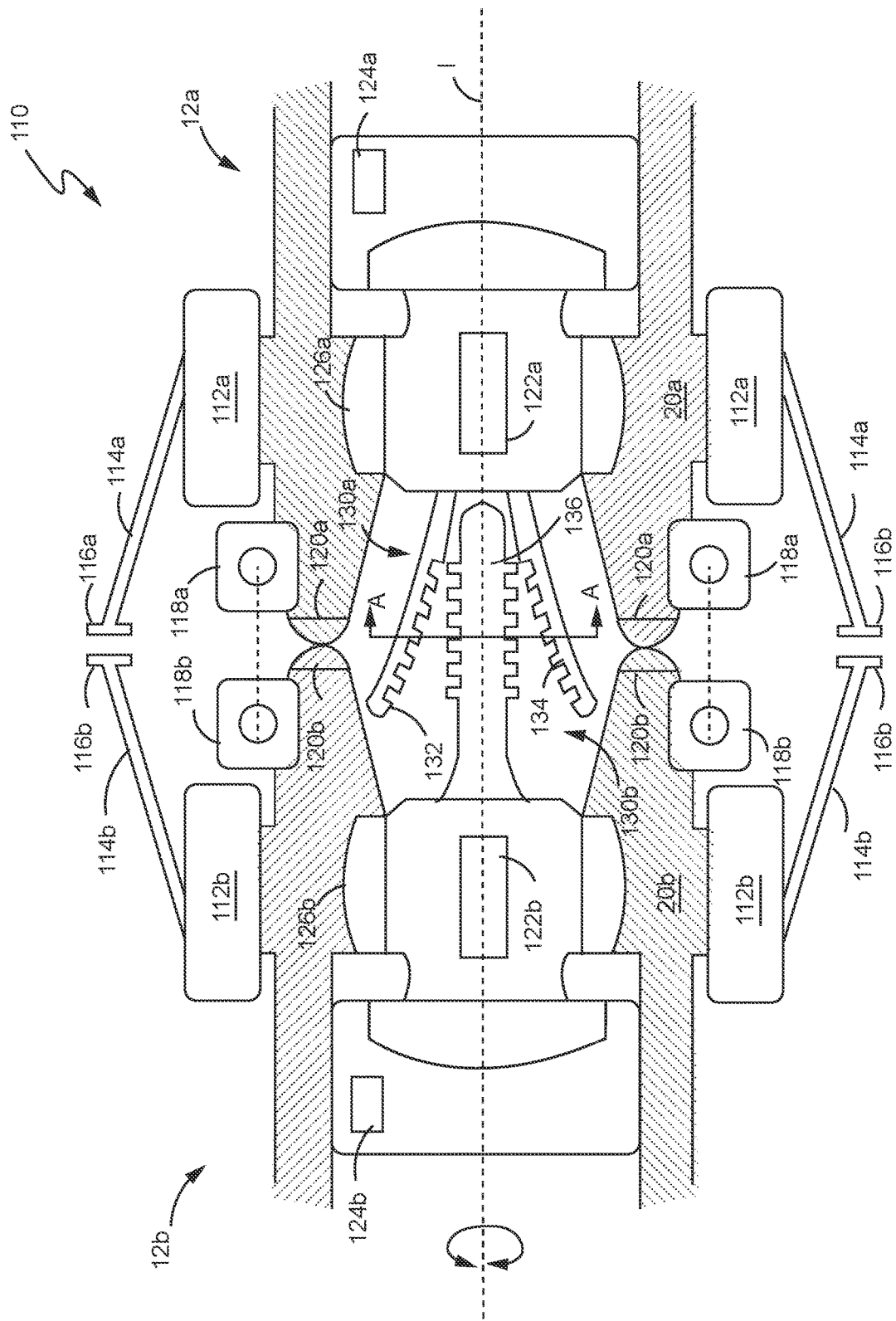
FIG. 14A is a functional block diagram illustrating a self-aligning docking mechanism in an open state according to one aspect of the present disclosure.
Figure 14B:
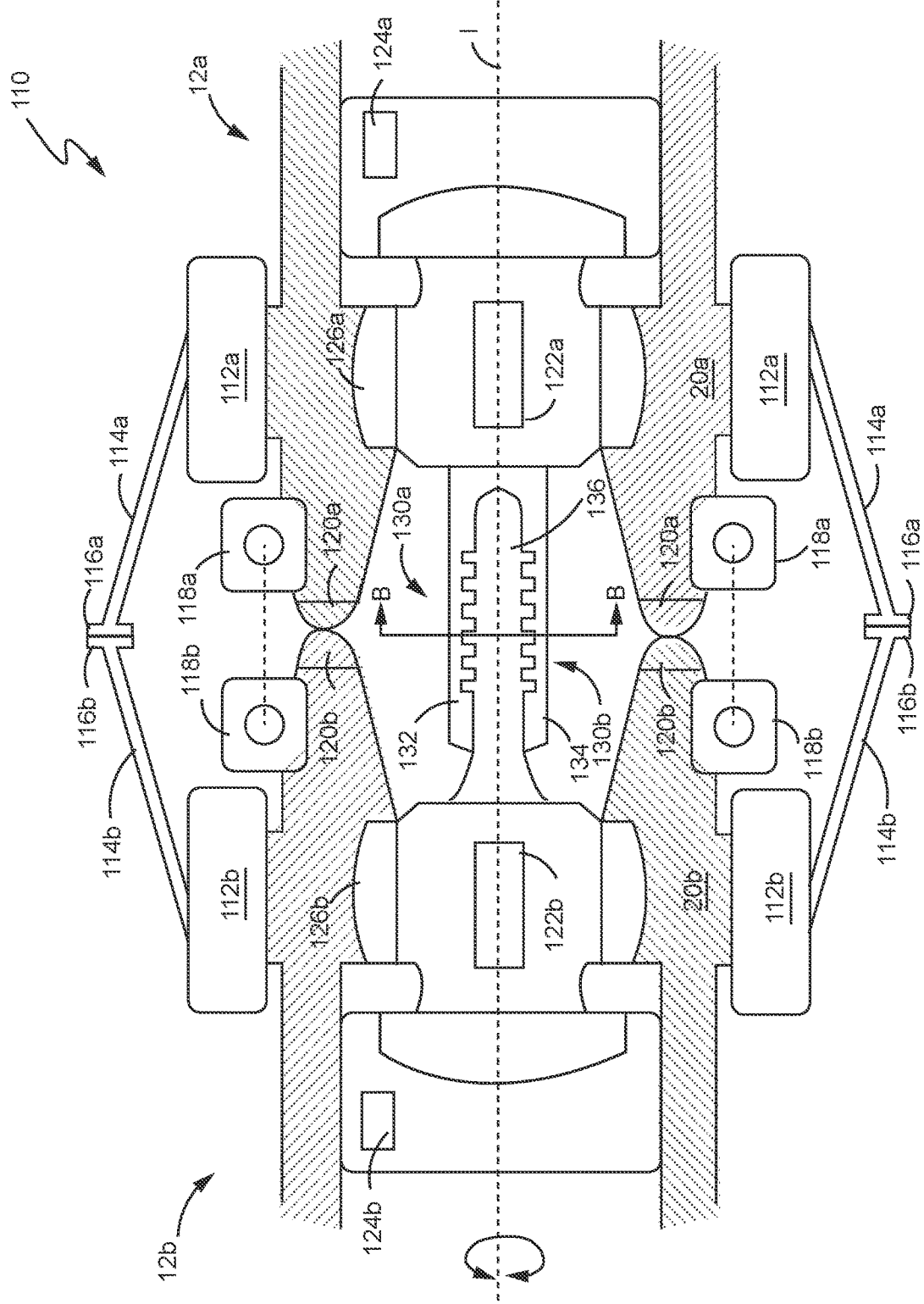
FIG. 14B is a functional block diagram illustrating the self-aligning docking mechanism in a closed state according to one aspect of the present disclosure.
Figure 15B:
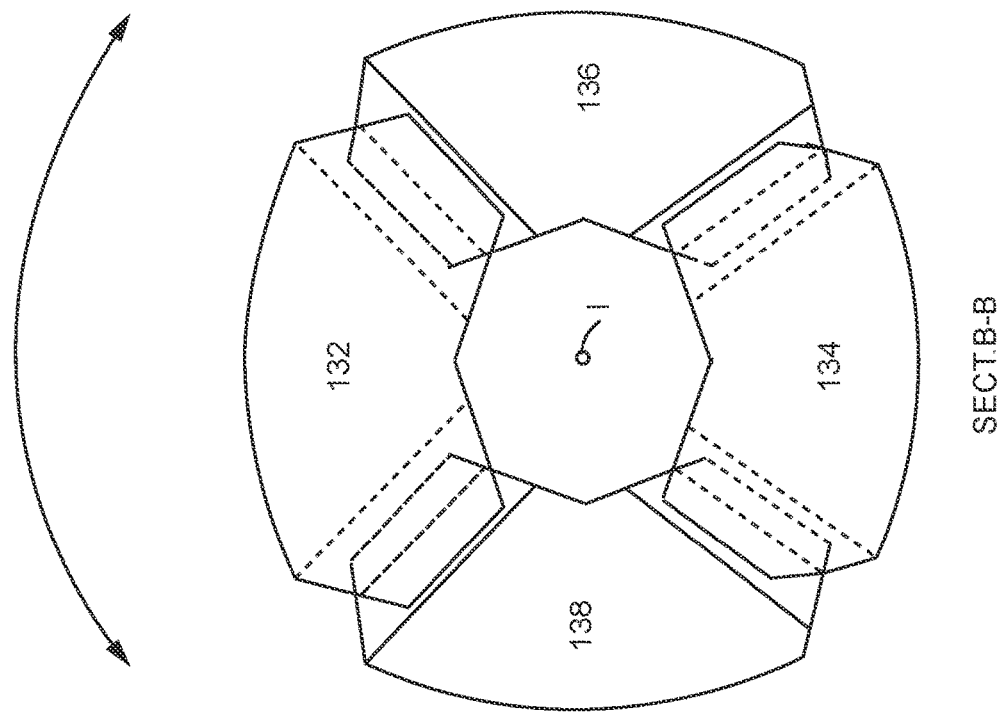
FIGS. 15A-15B illustrate a docking jaw configured according to one aspect of the present disclosure seen along section A-A and B-B, respectively.
Figure 15A:
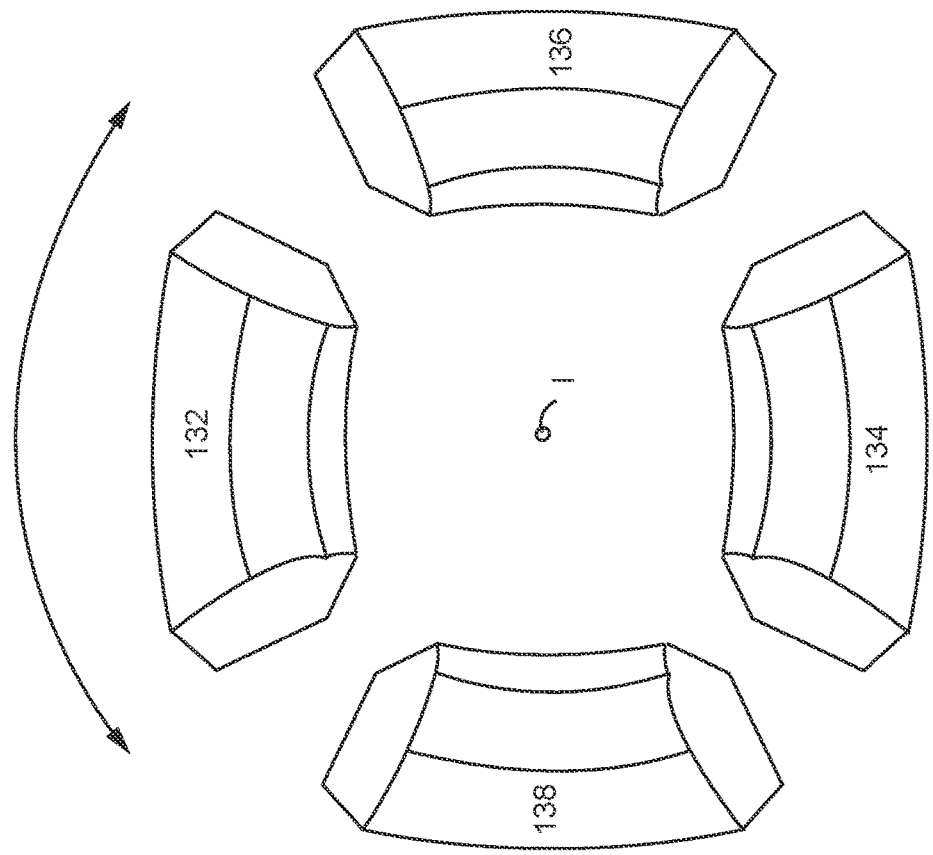

As seen in FIGS. 14A and 15A, the grippers 132, 134, as well as grippers 136, 138, are in an "open" state. In FIGS. 14B and 15B, however, grippers 132, 134, and grippers 136, 138, are in a "closed" state. As those of ordinary skill in the art will appreciate, there are a variety of ways in which the grippers 132, 134, 136, 138 are configured so as to facilitate this functionality.

In one aspect, for example, grippers 132, 134, 136, 138 comprise a "shape memory alloy." A shape memory alloy comprises a material that transitions to a first shape at a first temperature and to a second shape at a second temperature that is different from the first temperature. The alloy makes such a transition sua sponte, in other words, without any external forces acting on the material. In some aspects, such deformation is accomplished by selectively applying an electrical current to the shape memory alloy material that comprises the grippers 132, 134, 136, 138 (e.g., to create Joule heating and thereby selectively control a temperature of the grippers 132, 134, 136, 138).

In more detail, each docking-jaw servo control circuit 122a, 122b is configured to selectively apply the electrical current to its respective docking jaw 130a, 130b. In a default state, for example, neither docking-jaw servo control circuit 122a, 122b would apply an electric current to the grippers 132, 134, 136, 138 (or alternatively, the current would be maintained below a predetermined level) thereby causing grippers 132, 134, 136, 138 to move to the "closed" state (see FIGS. 14B, 15B). In the closed state, the ridges formed on the grippers 132, 134, 136, 138 contact each other, which helps maintain UAVs 12a, 12b docked to one another. To "open" the docking jaws 130a, 130b, however, the docking-jaw servo control circuits 122a, 122b are configured to apply an electrical current to the grippers 132, 134, 136, 138. Applying the electrical current causes the shape memory alloy to heat thereby causing the grippers 132, 134, 136, 138 to move or "curl" away from each other (see FIGS. 14A, 15A). In this "open" state, the docking jaws 130a, 130b can be precisely aligned with each other. Once aligned, docking-jaw servo control circuits 122a, 122b ceases applying the electrical current to the docking jaws 130a, 130b, thereby causing grippers 132, 134, 136, 138 to once again return to their original, "closed" state.

Figure 16:
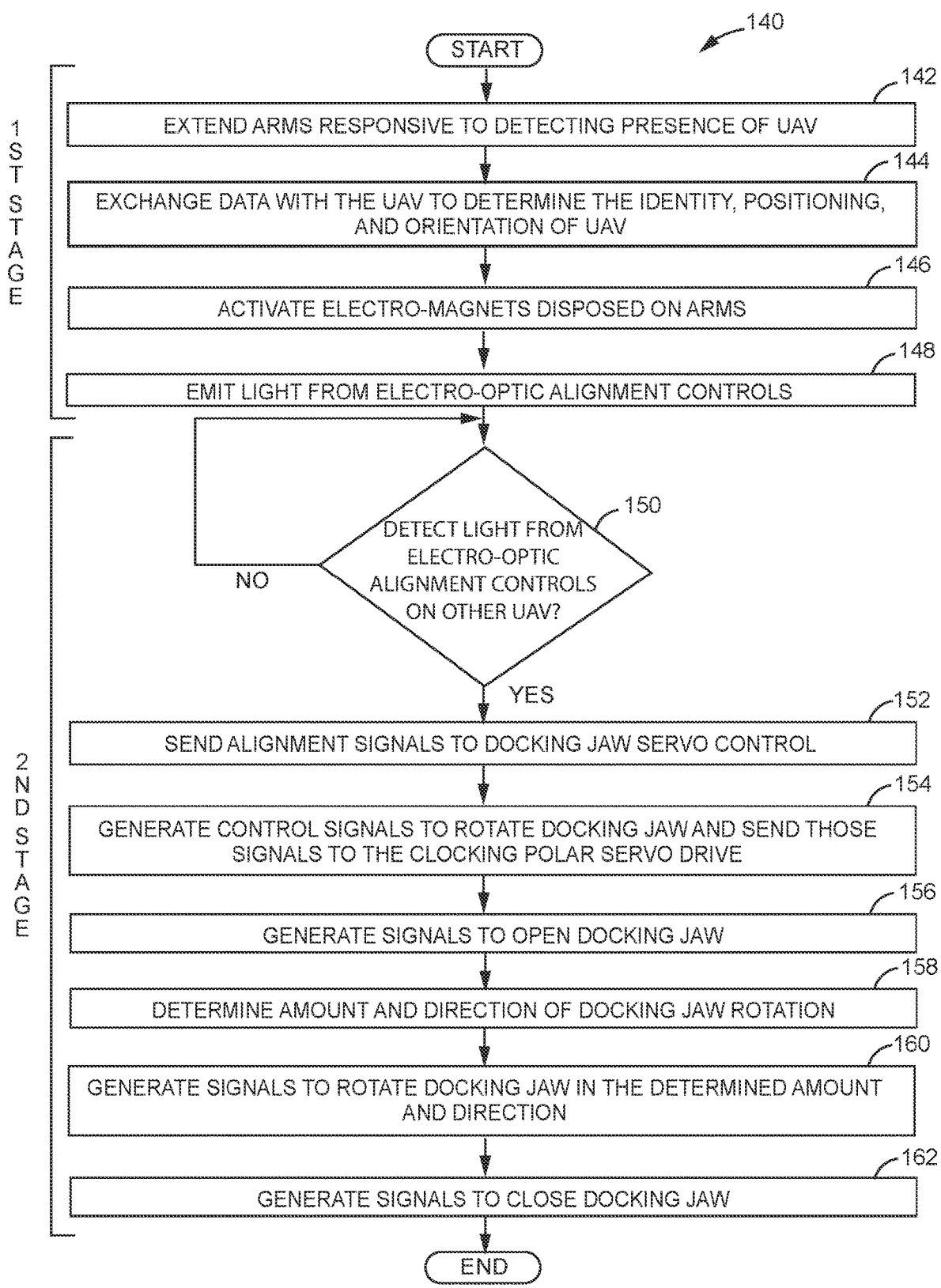
FIG. 16 is a flow chart illustrating a method of docking UAVs comprising the self-aligning docking mechanism according to one aspect of the present disclosure.

FIG. 16 is a flow diagram illustrating a method 140 for docking two UAVs 12a, 12b according to one aspect of the present disclosure. As detailed herein, method 140 of FIG. 16 is performed in two stages by the docking-jaw servo control circuit 122a of UAV 12a; however, those of ordinary skill in the art will readily appreciate that the description of method 140 in the context of a given UAV 12a is for illustrative purposes only, and that the method is easily extended to multiple UAVs.

In the first stage, method 140 begins with docking-jaw servo control circuit 122a detecting the presence of another UAV (e.g., UAV 12b) (box 142). As previously described, such detection can be accomplished using one or more proximity sensors, or using any means known in the art. Once docking-jaw servo control circuit 122a has detected another UAV in close proximity, data is exchanged with the other UAV (box 144). Such data can include any information needed or desired, but in one aspect, comprises the ID of the UAV, as well as the position and/or orientation of the UAV. Docking-jaw servo control circuit 122a then activates the electro-magnetic members 116a disposed at the terminal ends of the arms 114a (box 146), and causes the electro-optic alignment controls 118a to begin emitting a signal, which in this case is light (box 148). The emitted light will be detectable by corresponding electro-optic alignment controls 118b associated with the other UAV 12b.

In the second stage, method 140 calls for docking-jaw servo control circuit 122a to detect alignment signals (e.g., light) emitted by the electro-optic alignment controls 118b of UAV 12b (box 150). Once detected, docking-jaw servo control circuit 122a sends those signals to the docking-jaw servo control circuit 122a (box 152), and then generates and sends alignment signals to the clocking polar servo drive circuit 124a causing that circuit to rotate the docking jaws 130a (box 154) (e.g., to the docking jaws 130a rotate to account for differences in orientation, such as a difference in pitch, between UAV12a and UAV12b. Docking-jaw servo control circuit 122a then generates the necessary signals to open docking jaw 130a, such as a voltage or current above a specified threshold, for example (box 156). As stated above, the docking jaw 130a, in one aspect, comprises a smart material such as a smart memory alloy configured to alter its shape in response to the application of an electric current. Thus, so long as the current is being applied to the smart memory alloy, docking jaw 130a remains in the open state.

Docking-jaw servo control circuit 122a then determines an amount and direction in which to rotate the docking jaw 130a, as previously described (box 158), and generates the signals needed to rotate the docking jaw 130a in the determined amount and direction (box 160). So aligned, docking-jaw servo control circuit 122a generates the signals needed to close the docking jaw 130 (box 162). As previously stated, generating the signals needed to close the docking jaw 130a may comprise the docking-jaw servo control circuit 122a ceasing to generate and send the signals that caused the docking jaw 130a to remain open. By simply ceasing sending the signal, aspects of the present disclosure can effect the closure of the docking jaw 130a while simultaneously saving precious energy resources. To once again open the docking jaw 130a (i.e., to release UAV 12a from another UAV), one aspect of the disclosure calls for the docking-jaw servo control circuit 122a to cease generating and sending the electrical current to the docking jaw 130a.

Figure 17:
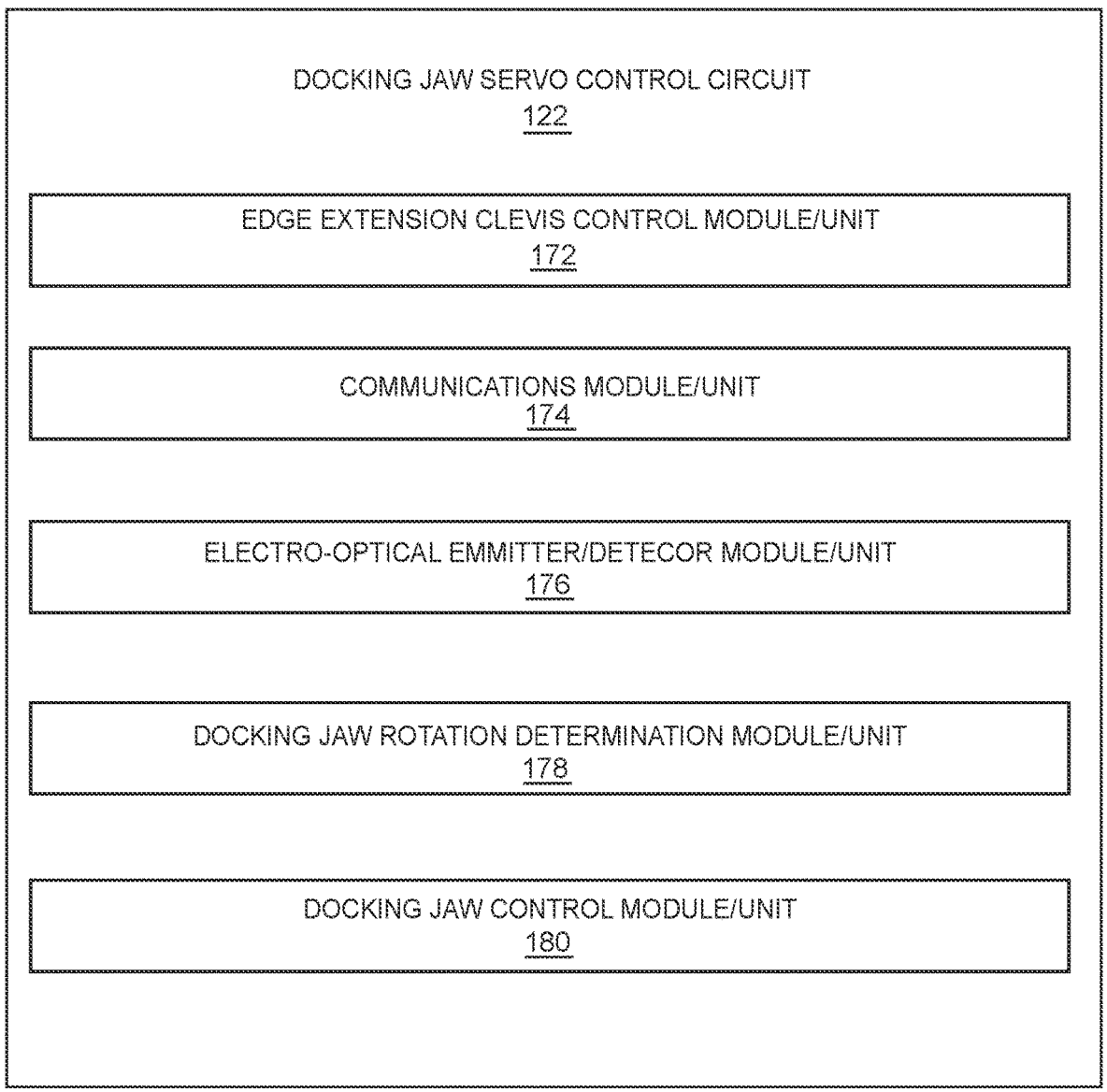
FIG. 17 is a functional block diagram illustrating a docking-jaw servo control circuit configured according to one aspect of the present disclosure.

FIG. 17 is a functional block diagram illustrating the docking-jaw servo control circuit 122 implemented as different hardware units and software modules according to one aspect of the present disclosure. As seen in FIG. 17, the docking-jaw servo control circuit 122 comprises an edge extension clevis control module/unit 172, a communications module/unit 174, an electro-optical emitter/detector module/unit 176, a docking-jaw servo determination module/unit 178, and a docking jaw control module/unit 180.

The edge extension clevis control module/unit 172 is configured to control the extension of arms 114 from the edge extension clevis 112 responsive to the UAV 12 detecting another UAV 12 with which it will dock. Particularly, in response to one or more control signals, the edge extension clevis control module/unit 172 extends arms 114 and activates the electro-magnetic members 116 disposed at the terminal end of arms 114 to magnetically couple to the electro-magnetic members associated with the other UAV 12. When undocking, edge extension clevis control module/unit 172 is configured to disable the electro-magnetic members 116 to allow the UAVs to disconnect from one another, and then subsequently retract the arms 114 back into, or towards, frame 20 of UAV 12.

The communications module/unit 174 is configured to send and receive data, signals, and information to and from clocking polar servo drive circuit 124 to effect rotation of the docking jaw 130, and in some aspects, to communicate with one or more other processing circuits associated with UAV 12. The electro-optical emitter/detector module/unit 176 is configured to activate the docking alignment control circuit 118 to cause the docking alignment control circuit 118 to begin emitting light that is detected by a corresponding docking alignment control circuit 118 disposed on the other UAV 12. Additionally, docking alignment control circuit 118 is also configured to detect light emitted by the corresponding docking alignment control circuits 118 associated with other UAVs.

The docking-jaw servo determination module/unit 178 is configured to determine an amount of rotation for a docking jaw 130, as well as a direction in which the docking jaw is to be rotated. The docking jaw control module/unit 180 is configured to rotate the docking jaw 130 responsive to data output by the docking-jaw servo determination module/unit 178, as well as to cause the docking jaw 130 to open and close in response to the selective application of an electrical current, as previously described.

As previously described, the present disclosure beneficially provides different types of UAVs, each of which is configured to perform a different function. Further, such functional variety is advantageous when configuring a UAV cluster 10 for a particular type of mission. For example, consider missions that require the UAV cluster 10 to deliver one or more light payloads to one or more corresponding destination locations. In these cases, the individual UAVs in the UAV cluster 10 might not require additional power resources or fuel reserves, but instead, be configured to include mostly UAVs designed to carry individual light loads. Such UAV cluster configurations would be different, however, than those of a UAV cluster 10 configured to fly long distances and/or carry and deliver a heavy payload to a destination location. In these latter scenarios, it would be beneficial to configure the UAV cluster 10 to include one or more UAVs specifically designed to provide additional power resources for the other UAVs.

Figure 18:
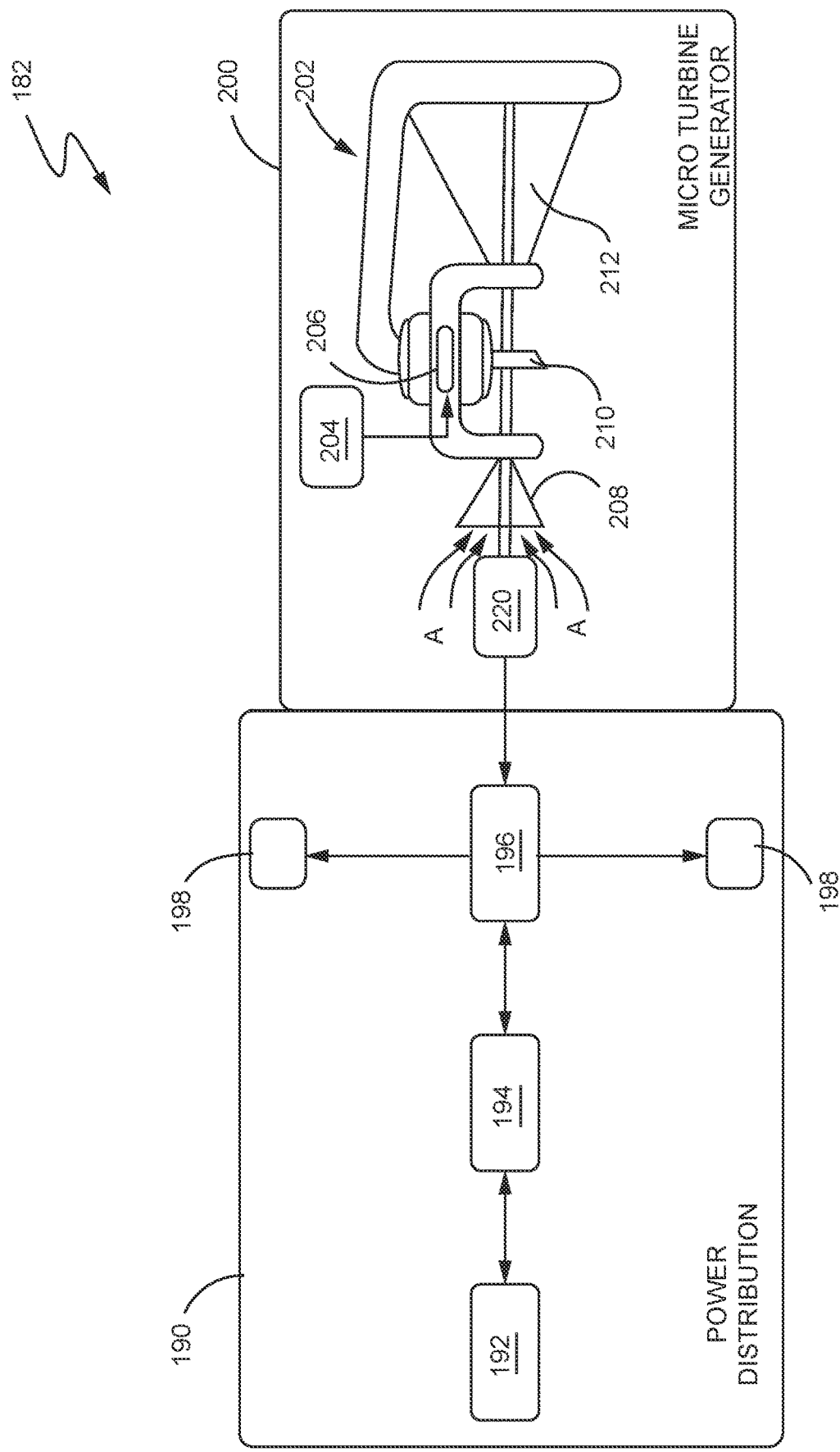
FIG. 18 is a functional block diagram of a power resource component configured to generate and distribute power to one or more UAVs in a UAV cluster according to one aspect of the present disclosure.

FIG. 18, for example, is a functional block diagram of a power resource component 182 for a UAV specially configured to generate and distribute power to one or more other UAVs in a UAV cluster 10. As seen in FIG. 18, the power resource component 182 comprises a power distribution section 190 configured to distribute power resources to other UAVs in a UAV cluster 10, and a power generator section 200 configured to generate the power that gets distributed to other UAVs in a UAV cluster 10.

In more detail, the power distribution section 190 comprises a navigation, communications, and flight control circuit 192, an electrical power storage circuit 194, and a power conditioner circuit 196 operatively coupled to one or more power distribution ports 198. The navigation, communications, and flight control circuit 192 comprises circuitry (e.g., a microprocessor or the like) configured to control the navigation and communications of the UAV configured with the power resource component 182. In particular, the navigation, communications, and flight control circuit 192 is configured to exchange data and information with the processing circuits of the other UAVs to ensure that the UAV having the configured with the power resource component 182 knows of the flight plan, changes to the flight plan, and the like.

Additionally, in some aspects, the navigation, communications, and flight control circuit 192 exchanges messages with the circuitry of the other UAVs in UAV cluster 10 to grant requests for additional power resources. Such requests can be received, for example, when another UAV in the cluster is running low on electrical power and requires a charge to continue its mission. In one aspect, received messages requesting the power resources are sent to the power conditioner circuit 196 for processing. As described in more detail below, the power conditioner circuit 196 can then provide the power resources to the requesting UAV.

The electrical power storage circuit 194 comprises circuitry configured to store the electricity generated by the power generator section 200. In this aspect, the power resource component 182 can distribute the power stored in the electrical power storage circuit 194 to other UAVs under the control of the power conditioner circuit 196.

The power conditioner circuit 196, which also comprises a microprocessor circuit, grants or denies the requests for additional power resources received from the navigation, communications, and flight control circuit 192. Provided the request is granted, the power conditioner circuit 196 generates the control signals required for the the power stored in the electrical power storage circuit 194 to the requesting UAVs via one or more of the power distribution ports 198. Additionally, in one aspect, the power conditioner circuit 196 is configured to condition the power resources provided to the power distribution ports. Such conditioning improves the quality of the electrical power provided to the power distribution ports 198 by removing power spikes, regulating the power levels, suppressing noise, and the like.

The power generator section 200 comprises a micro-turbine engine 202 and a generator 220. The micro-turbine engine 202 further comprises a fuel reservoir 204, a combustion chamber 206, a compressor 208, an exhaust 210, a turbine 212. In operation, fuel from fuel reservoir 204 is provided to the combustion chamber 206 where it is mixed with air A entering compressor 208 and burned. The resultant burning gasses drive the turbine 212, which in turn, drives the generator 220 to generate electricity. The generated electricity is provided to the power conditioner circuit 196, which then conditions and stores the electrical power in the electrical power storage circuit 194 for later delivery to requesting UAVs via the power distribution ports 198, as previously described.

The foregoing description and the accompanying drawings represent non-limiting examples of the methods and apparatus taught herein. As such, the aspects of the present disclosure are not limited by the foregoing description and accompanying drawings. Instead, the aspects of the present disclosure are limited only by the following claims and their legal equivalents.

What is claimed is:

1. A self-aligning docking mechanism for an unmanned aerial vehicle (UAV), the self-aligning docking mechanism comprising:
   an alignment circuit configured to generate an alignment signal representing a current alignment of the UAV with a proximate UAV responsive to detecting an indicator signal emitted by the proximate UAV;
   a docking jaw configured to grip a corresponding docking jaw disposed on the proximate UAV;
   a docking control circuit configured to:
      align the docking jaw with the corresponding docking jaw on the proximate UAV based on the alignment signal; and
      control the docking jaw to grip the corresponding docking jaw to dock the UAV to the proximate UAV; and
   a servo drive operatively connected to both the docking jaw and the docking control circuit, and wherein to align the docking jaw with the corresponding docking jaw, the docking control circuit is configured to:
      determine whether the docking jaw is aligned with the corresponding docking jaw responsive to an analysis of the alignment signal; and
      send an alignment message to the servo drive responsive to determining that the docking jaw and the corresponding docking jaw are not aligned.

2. The self-aligning docking mechanism of claim 1, further comprising an extendable arm configured to releasably attach to a corresponding extendable arm on the proximate UAV.

3. The self-aligning docking mechanism of claim 2, wherein the extendable arm comprises a magnetic component configured to releasably connect to a corresponding magnetic component disposed on the corresponding extendable arm of the proximate UAV.

4. The self-aligning docking mechanism of claim 1, wherein to align the docking jaw with the corresponding docking jaw, the servo drive is configured to:
   generate one or more alignment commands responsive to receiving the alignment message from the docking control circuit; and
   rotate the docking jaw about a longitudinal axis using the one or more alignment commands.

5. The self-aligning docking mechanism of claim 1, wherein the docking jaw is configured to move between an open state to undock from the corresponding docking jaw, and a closed state to dock with the corresponding docking jaw.

6. The self-aligning docking mechanism of claim 5, wherein the docking jaw comprises opposing first and second grippers constructed from a shape memory alloy, and wherein the docking control circuit is further configured to:
   apply a first voltage to each of the first and second grippers to move the docking jaw to the open state, wherein the first voltage meets or exceeds a threshold value; and
   reduce the first voltage being applied to the first and second grippers to a second voltage to move the docking jaw to the closed state, wherein the second voltage is less than the threshold value.

7. The self-aligning docking mechanism of claim 6, wherein to reduce the first voltage to the second voltage, the docking control circuit is configured to cease applying the first voltage to the first and second grippers.

8. The self-aligning docking mechanism of claim 1, wherein the indicator signal emitted by the proximate UAV comprises an optical signal.

9. A method of docking a first unmanned aerial vehicle (UAV) and a second UAV, the method implemented by the first UAV and comprising:
   during a first docking stage:
      generating an alignment signal indicating a current state of alignment between the first and second UAVs responsive to detecting an indicator signal emitted by the second UAV; and
   during a second docking stage:
      aligning a docking jaw of the first UAV to a corresponding docking jaw of the second UAV based on the alignment signal; and
      docking the first and second UAVs, wherein the docking comprises controlling the docking jaw of the first UAV to grip the corresponding docking jaw of the second UAV;
   wherein aligning the docking jaw of the first UAV to the corresponding docking jaw of the second UAV comprises:
      determining whether the docking jaw of the first UAV is aligned with the corresponding docking jaw of the second UAV responsive to an analysis of the alignment signal, and
      sending an alignment message to a servo drive operatively connected to both the docking jaw of the first UAV and a docking control circuit of the first UAV responsive to determining that the docking jaw and the corresponding docking jaw are not aligned.

10. The method of claim 9, further comprising, during the first docking stage, releasably coupling an arm extending from the first UAV to a corresponding arm extending from the second UAV.

11. The method of claim 10, wherein releasably coupling an arm extending from the first UAV to a corresponding arm extending from the second UAV comprises magnetically coupling the arm extending from the first UAV to the corresponding arm extending from the second UAV.

12. The method of claim 9, wherein aligning a docking jaw of the first UAV to a corresponding docking jaw of the second UAV based on the alignment signal comprises rotating the docking jaw of the first UAV about a longitudinal axis responsive to determining that the first and second UAVs are misaligned.

13. The method of claim 9, wherein the docking jaw of the first UAV comprises opposing first and second grippers constructed from a shape memory alloy, and wherein the method further comprises:
   applying a first voltage to each of the first and second grippers to open the docking jaw, wherein the first voltage meets or exceeds a threshold value; and
   reducing the first voltage being applied to the first and second grippers to a second voltage to close the docking jaw, wherein the second voltage is less than the threshold value.

14. The method of claim 13, wherein reducing the first voltage to the second voltage comprises ceasing to apply the first voltage to the first and second grippers.

15. A non-transitory computer-readable medium storing software instructions that, when executed by processing circuitry on a first unmanned aerial vehicle (UAV), causes the processing circuitry to:

during a first docking stage:
  generate an alignment signal indicating a current state of alignment between the first UAV and a second UAV responsive to detecting an indicator signal emitted by the second UAV;
during a second docking stage:
  align a docking jaw of the first UAV to a corresponding docking jaw of the second UAV based on the alignment signal; and
  dock the first and second UAVs, wherein the docking comprises controlling the docking jaw of the first UAV to grip the corresponding docking jaw of the second UAV; and
  wherein to align the docking jaw of the first UAV to the corresponding docking jaw of the second UAV, the software instructions, when executed by the processing circuitry, causes the processing circuitry to:
    determine whether the docking jaw of the first UAV is aligned with the corresponding docking jaw of the second UAV responsive to an analysis of the alignment signal; and
    send an alignment message to a servo drive operatively connected to both the docking jaw of the first UAV and a docking control circuit of the first UAV responsive to determining that the docking jaw and the corresponding docking jaw are not aligned.

16. The non-transitory computer-readable medium of claim 15, wherein the software instructions, when executed by the processing circuitry, further cause the processing circuitry to, during the first docking stage, releasably couple an arm extending from the first UAV to a corresponding arm extending from the second UAV.

17. The non-transitory computer-readable medium of claim 16, wherein the software instructions, when executed by the processing circuitry, further cause the processing circuitry to releasably couple the arm extending from the first UAV to the corresponding arm extending from the second UAV by magnetically coupling the arm extending from the first UAV to the corresponding arm extending from the second UAV.

18. The non-transitory computer-readable medium of claim 15, wherein the software instructions, when executed by the processing circuitry, further cause the processing circuitry to align the docking jaw of the first UAV to the corresponding docking jaw of the second UAV based on the alignment signal by rotating the docking jaw of the first UAV about a longitudinal axis responsive to determining that the first and second UAVs are misaligned.

19. The non-transitory computer-readable medium of claim 15, wherein the docking jaw of the first UAV comprises opposing first and second grippers constructed from a shape memory alloy, and wherein the software instructions, when executed by the processing circuitry, further cause the processing circuitry to:
  apply a first voltage to each of the first and second grippers to open the docking jaw, wherein the first voltage meets or exceeds a threshold value; and
  reduce the first voltage being applied to the first and second grippers to a second voltage to close the docking jaw, wherein the second voltage is less than the threshold value.

20. The non-transitory computer-readable medium of claim 19, wherein the software instructions, when executed by the processing circuitry, further cause the processing circuitry to reduce the first voltage to the second voltage by ceasing to apply the first voltage to the first and second grippers.

* * * * *